United States Patent
Sumitomo et al.

(10) Patent No.: US 12,480,547 B2
(45) Date of Patent: Nov. 25, 2025

(54) THRUST MAGNETIC BEARING WITH COOLING STRUCTURE

(71) Applicant: DAIKIN INDUSTRIES, LTD., Osaka (JP)

(72) Inventors: Hisato Sumitomo, Osaka (JP); Shouhei Yamasuso, Osaka (JP); Yuji Nakazawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 239 days.

(21) Appl. No.: 18/127,447

(22) Filed: Mar. 28, 2023

(65) Prior Publication Data

US 2023/0228297 A1 Jul. 20, 2023

Related U.S. Application Data

(63) Continuation of application No. PCT/JP2021/034998, filed on Sep. 24, 2021.

(30) Foreign Application Priority Data

Sep. 29, 2020 (JP) .................. 2020-163552

(51) Int. Cl.
  *F16C 37/00* (2006.01)
  *F16C 32/04* (2006.01)
(52) U.S. Cl.
  CPC ........ *F16C 37/005* (2013.01); *F16C 32/0461* (2013.01); *F16C 32/047* (2013.01); *F16C 2360/24* (2013.01)
(58) Field of Classification Search
  CPC .. F16C 37/005; F16C 32/0461; F16C 32/047; F16C 2360/24; F16C 32/0442; F16C 39/06

USPC ......................................................... 310/90.5
See application file for complete search history.

(56) References Cited

U.S. PATENT DOCUMENTS

2007/0273219 A1 11/2007 Shimada
2021/0010536 A1 1/2021 Yamasuso et al.

FOREIGN PATENT DOCUMENTS

| JP | 4-224313 A | 8/1992 |
|---|---|---|
| JP | 4-296218 A | 10/1992 |
| JP | 4-355104 A | 12/1992 |
| JP | 5-71533 A | 3/1993 |
| JP | 3042545 B2 | 5/2000 |
| JP | 2005-261083 A | 9/2005 |

(Continued)

OTHER PUBLICATIONS

JP3042545B2 English translation (Year: 2025).*

(Continued)

*Primary Examiner* — Christopher M Koehler
*Assistant Examiner* — Viswanathan Subramanian
(74) *Attorney, Agent, or Firm* — GLOBAL IP COUNSELORS, LLP

(57) ABSTRACT

A thrust magnetic bearing includes a coil formed by winding a conductive wire, and a core that houses the coil. The core is provided with a refrigerant inlet and a refrigerant outlet. A refrigerant flow path connecting the refrigerant inlet and the refrigerant outlet is provided between the coil and the core. The refrigerant flow path is formed so that a refrigerant flowing from the refrigerant inlet to the refrigerant outlet mainly flows along the coil in a winding direction of the coil.

14 Claims, 15 Drawing Sheets

(56) References Cited

FOREIGN PATENT DOCUMENTS

| | | |
|---|---|---|
| JP | 2016-118226 A | 6/2016 |
| JP | 2019-173823 A | 10/2019 |

OTHER PUBLICATIONS

JP 2016118226 A English translation (Year: 2025).*
International Preliminary Report of corresponding PCT Application No. PCT/JP2021/034998 dated Apr. 13, 2023.
International Search Report of corresponding PCT Application No. PCT/JP2021/034998 dated Nov. 16, 2021.
European Search Report of corresponding EP Application No. 21 87 5397.8 dated Aug. 29, 2024.

* cited by examiner

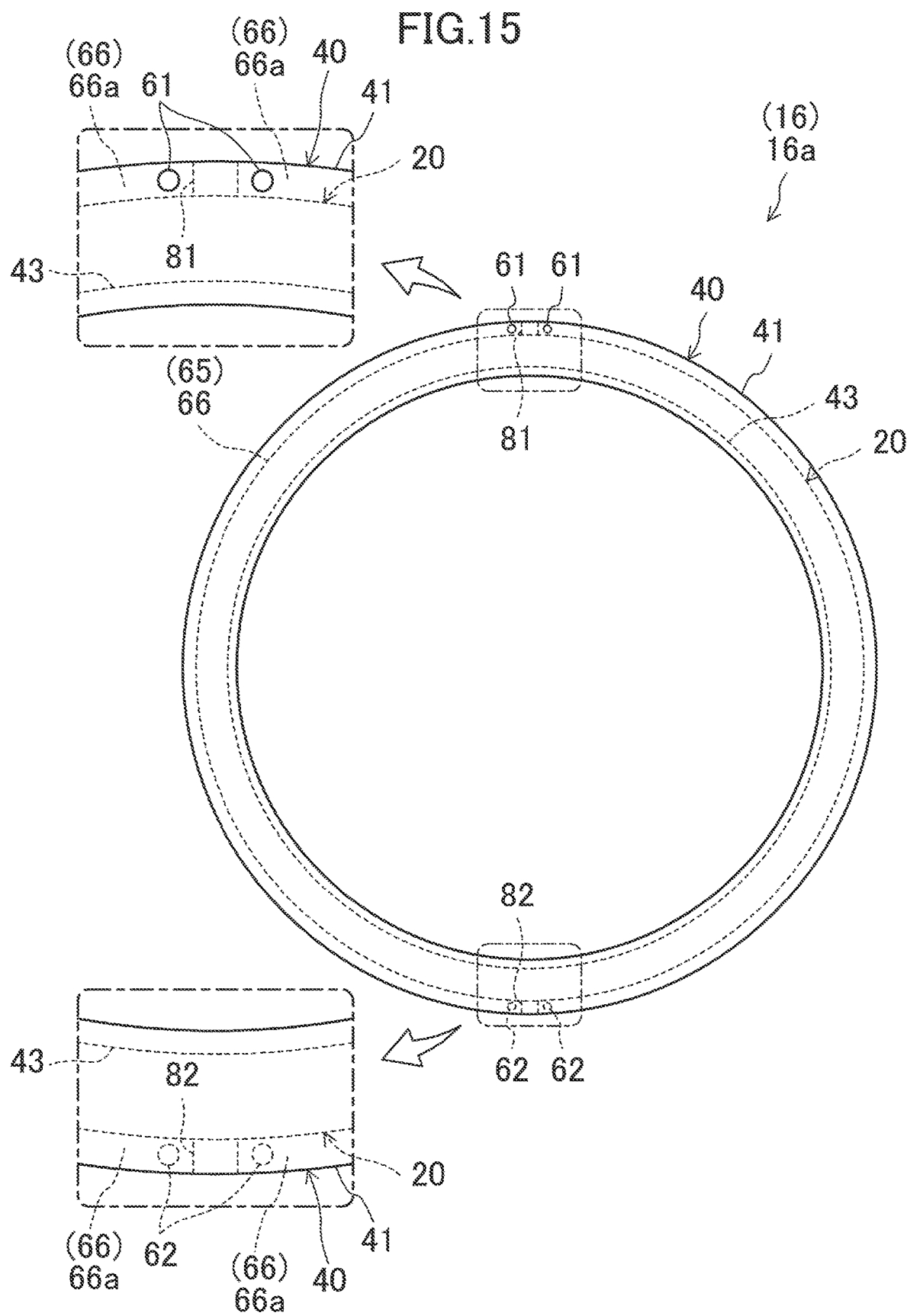

THRUST MAGNETIC BEARING WITH COOLING STRUCTURE

CROSS-REFERENCE TO RELATED APPLICATIONS

This is a continuation of International Application No. PCT/JP2021/034998 filed on Sep. 24, 2021, which claims priority to Japanese Patent Application No. 2020-163552, filed on Sep. 29, 2020. The entire disclosures of these applications are incorporated by reference herein.

BACKGROUND

Technical Field

The present disclosure relates to a thrust magnetic bearing.

Background Art

Japanese Unexamined Patent Application Publication No. 2019-173823 discloses a thrust magnetic bearing. The thrust magnetic bearing includes a stator having a coil, and a rotor.

SUMMARY

The first aspect of the present disclosure relates to a thrust magnetic bearing. The thrust magnetic bearing includes a coil formed by winding a conductive wire, and a core that houses the coil. The core is provided with a refrigerant inlet and a refrigerant outlet. A refrigerant flow path connecting the refrigerant inlet and the refrigerant outlet is provided between the coil and the core. The refrigerant flow path is formed so that a refrigerant flowing from the refrigerant inlet to the refrigerant outlet mainly flows along the coil in a winding direction of the coil.

BRIEF DESCRIPTION OF THE DRAWINGS

FIG. 15 is a plan view illustrating a part of a configuration of a thrust magnetic bearing according to a ninth modification of the embodiment.

DETAILED DESCRIPTION OF EMBODIMENT(S)

Figure 1:
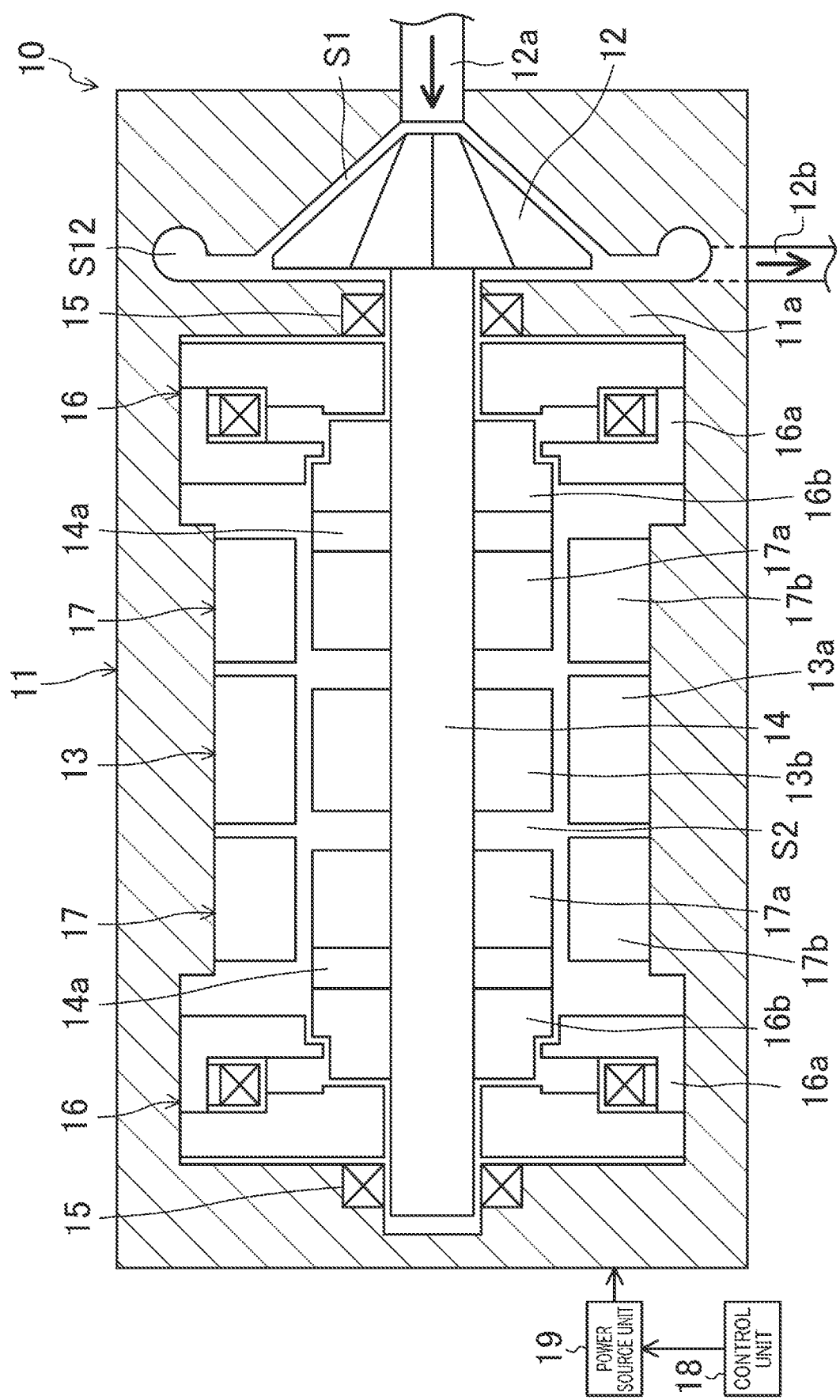
FIG. 1 is a longitudinal sectional view illustrating a configuration of a turbo compressor.

Hereinafter, an embodiment will be described in detail with reference to the drawings. Note that in the drawings, the same or equivalent portions are denoted by the same reference numerals, and the description thereof will not be repeated.

FIG. 1 illustrates a configuration of a turbo compressor (10) of an embodiment. The turbo compressor (10) includes a casing (11), an impeller (12), a motor (13), a shaft (14), a touchdown bearing (15), a thrust magnetic bearing (16), a radial magnetic bearing (17), a control unit (18), and a power source unit (19).

Casing

The casing (11) is formed in a cylindrical shape whose both ends are closed and is disposed such that the cylinder axis is in a horizontal direction. A space in the casing (11) is divided by a wall portion (11a), and a space on the front side of the wall portion (11a) forms an impeller space (S1) for housing the impeller (12), while a space on the rear side of the wall portion (11a) forms a driving mechanism space (S2) for housing the motor (13), the touchdown bearing (15), the thrust magnetic bearing (16), and the radial magnetic bearing (17). The shaft (14) connects the impeller (12) in the impeller space (S1) and the motor (13) in the driving mechanism space (S2).

Impeller

The impeller (12) is formed to have a substantially conical outer shape with a plurality of blades. The impeller (12) is housed in the impeller space (S1) while being fixed to one end portion of the shaft (14). A suction pipe (12a) and a discharge pipe (12b) are connected to the impeller space (S1), and a compression space (S12) is formed in an outer peripheral portion of the impeller space (S1). When the impeller (12) rotates, fluid is introduced into the impeller space (S1) from the outside through the suction pipe (12a). The fluid introduced into the impeller space (S1) is compressed in the compression space (S12), so that the high-pressure fluid in the compression space (S12) is returned to the outside through the discharge pipe (12b).

Motor

The motor (13) rotationally drives the shaft (14). The motor (13) includes a stator (13a) and a rotor (13b). The stator (13a) is fixed to an inner peripheral wall of the casing (11), and the rotor (13b) is fixed to the shaft (14). The rotor (13b) is disposed on the inner side of the stator (13a) such that the outer peripheral surface of the rotor (13b) faces the inner peripheral surface of the stator (13a) with a predetermined gap therebetween.

Touchdown Bearing

While the thrust magnetic bearing (16) and the radial magnetic bearing (17) are not driven and the shaft (14) is not floated, the touchdown bearing (15) is in contact with the shaft (14) to support the shaft (14).

Thrust Magnetic Bearing

The thrust magnetic bearing (16) controls the position of the shaft (14) in the thrust direction in a non-contact manner by electromagnetic force. The thrust magnetic bearing (16) includes a stator (16a) and a rotor (16b). The stator (16a) is fixed to the inner peripheral wall of the casing (11), and the rotor (16b) is fixed to the shaft (14). The rotor (16b) is disposed so as to face the stator (16a) with a predetermined gap therebetween in the thrust direction of the shaft (14).

In this example, two thrust magnetic bearings (16) are provided. One of the two thrust magnetic bearings (16) is disposed on one end side of the shaft (14), and the other of the two thrust magnetic bearings (16) is disposed on the other end side of the shaft (14) (the opposite side of the impeller (12) side).

Radial Magnetic Bearing

The radial magnetic bearing (17) controls the position of the shaft (14) in the radial direction in a non-contact manner by electromagnetic force. The radial magnetic bearing (17) includes a stator (17a) and a rotor (17b). The stator (17a) is fixed to the inner peripheral wall of the casing (11), and the rotor (17b) is fixed to the shaft (14). The rotor (17b) is disposed on the inner side of the stator (17a) so as to face the stator (17a) with a predetermined gap therebetween in the radial direction of the shaft (14).

In this example, two radial magnetic bearings (17) are provided. The two radial magnetic bearings (17) are disposed between the two thrust magnetic bearings (16). The motor (13) is disposed between the two radial magnetic bearings (17). One of the two radial magnetic bearings (17) is disposed on one end side of the shaft (14), and the other of the two radial magnetic bearings (17) is disposed on the other end side of the shaft (14) (the opposite side of the impeller (12) side).

Non-Magnetic Ring

Further, in this example, a non-magnetic ring (14a) is provided between the rotor (16b) of the thrust magnetic bearing (16) and the rotor (17b) of the radial magnetic bearing (17).

Various Sensors

The thrust magnetic bearing (16) and the radial magnetic bearing (17) are provided with various sensors such as a gap sensor (not illustrated). For example, the thrust magnetic bearing (16) is provided with a thrust gap sensor (not illustrated) that detects a gap between the stator (16a) and the rotor (16b) in the thrust direction, and the radial magnetic bearing (17) is provided with a radial gap sensor (not illustrated) that detects a gap between the stator (17a) and the rotor (17b) in the X-axis direction, which is an example of the radial direction, and with a radial gap sensor (not illustrated) that detects a gap between the stator (17a) and the rotor (17b) in the Y-axis direction, which is an example of the radial direction. Detection signals (detection results) of these various sensors are transmitted to the control unit (18).

Control Unit

The control unit (18) outputs a command value for controlling a current supplied to each of the thrust magnetic bearing (16) and the radial magnetic bearing (17) so that the position of the shaft (14) becomes a desired position, on the basis of detection signals of various sensors (for example, a thrust gap sensor and a radial gap sensor) provided for the thrust magnetic bearing (16) and the radial magnetic bearing (17). For example, the control unit (18) is formed by a processor and a memory that is electrically connected to the processor and stores a program and information for operating the processor.

Power Source Unit

The power source unit (19) supplies a current to each of the thrust magnetic bearing (16) and the radial magnetic bearing (17) on the basis of a command value output from the control unit (18). For example, the power source unit (19) is formed by a PWM amplifier.

Thrust Magnetic Bearing

Figure 2:
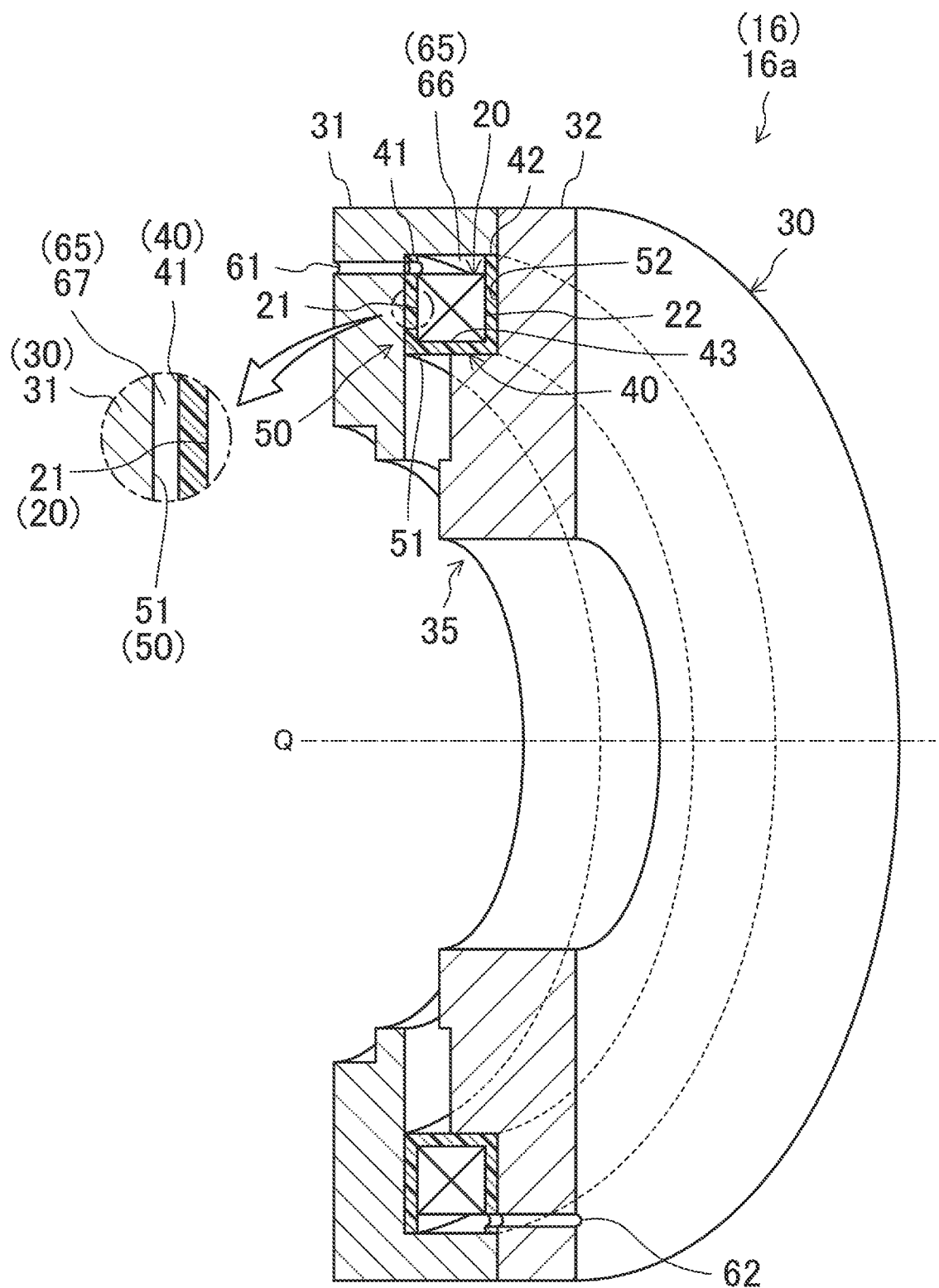
FIG. 2 is a sectional perspective view illustrating a configuration of a thrust magnetic bearing according to an embodiment.

FIG. 2 illustrates a configuration of the thrust magnetic bearing (16) according to the embodiment. The stator (16a) of the thrust magnetic bearing (16) includes a coil (20), a core (30), and an insulating member (40). Note that FIG. 2 does not illustrate the rotor (16b) of the thrust magnetic bearing (16).

Coil

The coil (20) is formed by winding a conductive wire.

Hereinafter, a direction of a winding axis (Q) of the coil (20) is referred to as an "axial direction", and a direction orthogonal to the direction of the winding axis (Q) of the coil (20) is referred to as a "radial direction". Further, a section along the axial direction is referred to as a "longitudinal section". Note that the winding axis (Q) is an axis of winding of the coil (20) to be wound.

In this example, the coil (20) is formed annularly. The longitudinal sectional shape of the coil (20) is rectangular. The coil (20) has a first end portion (21) as one end portion in the axial direction and a second end portion (22) as the other end portion in the axial direction.

Core

The core (30) houses the coil (20). The core (30) surrounds the outside in the radial direction of the coil (20). A gap is formed between a radially outer side of the coil (20) and the core (30). For example, the core (30) is a laminated core formed by laminating electromagnetic steel sheets. Note that the core (30) may be formed of another magnetic material such as a dust core.

Further, the core (30) is provided with a through-hole (35). The through-hole (35) passes through the core (30) in the axial direction at a position radially inside the coil (20). The shaft (14) is inserted into the through-hole (35).

In this example, the core (30) is formed annularly. The longitudinal sectional shape of the core (30) is a U-shape that is open radially inward. Specifically, the core (30) includes a first core (31) and a second core (32).

The first core (31) and the second core (32) are disposed in the axial direction. The first core (31) forms one end side in the axial direction of the core (30), and the second core (32) forms the other end side in the axial direction of the core (30). Each of the first core (31) and the second core (32) is formed annularly. The longitudinal sectional shape of the first core (31) is L-shaped. The longitudinal sectional shape of the second core (32) is rectangular. Inner peripheral surfaces of the first core (31) and the second core (32) form the through-hole (35).

A housing part (50) for housing the coil 20 is formed between the first core (31) and the second core (32). The housing part (50) is formed annularly. The longitudinal sectional shape of the housing part (50) is rectangular.

The housing part (50) has a first end portion (51) as one end portion in the axial direction and a second end portion

(52) as the other end portion in the axial direction. The first end portion (51) of the housing part (50) faces the first end portion (21) of the coil (20) in the axial direction. The second end portion (52) of the housing part (50) faces the second end portion (22) of the coil (20) in the axial direction. The radially outer side (in this example, the outer peripheral surface) of the housing part (50) faces the radially outer side (in this example, the outer peripheral surface) of the coil (20).

Note that a gap is formed between a radially outer side of the housing part (50) and the radially outer side of the coil (20). This gap corresponds to a gap between the radially outer side of the coil (20) and the core (30).

Insulating Member

The insulating member (40) insulates the coil (20) and the core (30) from each other. The insulating member (40) is disposed on both sides in the axial direction of the coil (20) and on a radially inner side of the coil (20). The insulating member (40) is housed in the core (30) together with the coil (20).

In this example, the insulating member (40) is formed annularly. The longitudinal sectional shape of the insulating member (40) is a U-shape that is open radially outward. Specifically, the insulating member (40) includes a first wall portion (41) that is one wall portion in the axial direction, a second wall portion (42) that is the other wall portion in the axial direction, and a coupling portion (43) that couples the first wall portion (41) and the second wall portion (42).

The first wall portion (41) of the insulating member (40) is disposed at the first end portion (21) of the coil (20). The second wall portion (42) of the insulating member (40) is disposed at the second end portion (22) of the coil (20). The coupling portion (43) of the insulating member (40) is disposed on the radially inner side (in this example, the inner peripheral surface) of the coil (20). The insulating member (40) is housed in the housing part (50) together with the coil (20). The first wall portion (41) of the insulating member (40) faces the first end portion (51) of the housing part (50) in the axial direction. The second wall portion (42) of the insulating member (40) faces the second end portion (52) of the housing part (50) in the axial direction.

Note that a gap is formed between the core (30) and the first wall portion (41) of the insulating member (40) disposed at the first end portion (21) of the coil (20). Specifically, the gap is formed between the first end portion (51) of the housing part (50) and the first wall portion (41) of the insulating member (40).

Refrigerant Inlet and Refrigerant Outlet

The core (30) is provided with a refrigerant inlet (61) and a refrigerant outlet (62).

In this example, the refrigerant inlet (61) is provided on one end side in the axial direction of the core (30). Specifically, the refrigerant inlet (61) passes through the first core (31) in the axial direction. The first wall portion (41) of the insulating member (40) is provided with a communication hole that allows the refrigerant inlet (61) to communicate with a gap between the radially outer side of the coil (20) and the radially outer side of the housing part (50).

Further, in this example, the refrigerant outlet (62) is provided on the other end side in the axial direction of the core (30). Specifically, the refrigerant outlet (62) passes through the second core (32) in the axial direction. The second wall portion (42) of the insulating member (40) is provided with a communication hole that allows the refrigerant outlet (62) to communicate with a gap between the radially outer side of the coil (20) and the radially outer side of the housing part (50).

Further, in this example, the refrigerant outlet (62) is provided at a position different from a position where it is visible from the refrigerant inlet (61) when viewed in the axial direction. Specifically, the refrigerant outlet (62) is provided at a position different from a position where it overlaps the refrigerant inlet (61) when viewed in the axial direction. For example, the refrigerant outlet (62) is disposed at a position deviated by 90° or more from the position of the refrigerant inlet (61) with the winding axis (Q) as a center. In the example of FIG. 2, the refrigerant outlet (62) is disposed at a position deviated by 180° from the position of the refrigerant inlet (61) with the winding axis (Q) as a center.

Further, in this example, the refrigerant pressure at the refrigerant inlet (61) is higher than the refrigerant pressure at the refrigerant outlet (62).

Refrigerant Flow Path

A refrigerant flow path (65) is provided between the coil (20) and the core (30). The refrigerant flow path (65) connects the refrigerant inlet (61) and the refrigerant outlet (62). The refrigerant flow path (65) is formed so that the refrigerant flowing from the refrigerant inlet (61) to the refrigerant outlet (62) mainly flows along the coil (20) in the winding direction of the coil (20).

In this example, the refrigerant flow path (65) includes a main flow path (66) and a sub flow path (67).

The main flow path (66) extends along the coil (20) in the winding direction of the coil (20). In this example, the main flow path (66) includes a gap between the radially outer side of the coil (20) and the core (30).

The sub flow path (67) extends along the coil (20) in the winding direction of the coil (20). In this example, the sub flow path (67) includes a gap between the core (30) and the first wall portion (41) of the insulating member (40) disposed at the first end portion (21) of the coil (20).

Note that the flow-path sectional area of the main flow path (66) is larger than the flow-path sectional area of the sub flow path (67).

Further, in this example, the refrigerant flow path (65) faces the coil (20). Specifically, the main flow path (66) of the refrigerant flow path (65) faces the coil (20). Note that the sub flow path (67) of the refrigerant flow path (65) does not face the coil (20).

Flow of Refrigerant

The following will describe the flow of a refrigerant in the thrust magnetic bearing (16) of the embodiment.

The refrigerant flowing into the refrigerant flow path (65) through the refrigerant inlet (61) mainly flows through the main flow path (66). In the main flow path (66), the refrigerant flows along the coil (20) in the winding direction of the coil (20). Thus, the coil (20) is cooled. Then, the refrigerant in the main flow path (66) flows out through the refrigerant outlet (62).

Further, part of the refrigerant flowing into the refrigerant flow path (65) through the refrigerant inlet (61) flows through the sub flow path (69). Note that the flow rate of the refrigerant flowing through the sub flow path (67) is smaller than the flow rate of the refrigerant flowing through the main flow path (66). In the sub flow path (67), the refrigerant flows along the coil (20) in the winding direction of the coil (20). In this manner, the first wall portion (41) of the insulating member (40) is cooled, and the coil (20) is indirectly cooled. Then, the refrigerant in the sub flow path (67) flows out through the refrigerant outlet (62) or the through-hole (35).

Description of Comparative Example

Next, the thrust magnetic bearing (16) of a comparative example will be described with reference to FIG. 3. Note that hereinafter, the thrust magnetic bearing (16) of the comparative example will be referred to as a "thrust magnetic bearing (9)". Further, for convenience of explanation, among the components of the thrust magnetic bearing (9), the same components as the components of the thrust magnetic bearing (16) of the embodiment are denoted by the same reference numerals as the reference numerals of the components of the thrust magnetic bearing (16) of the embodiment.

Figure 3:
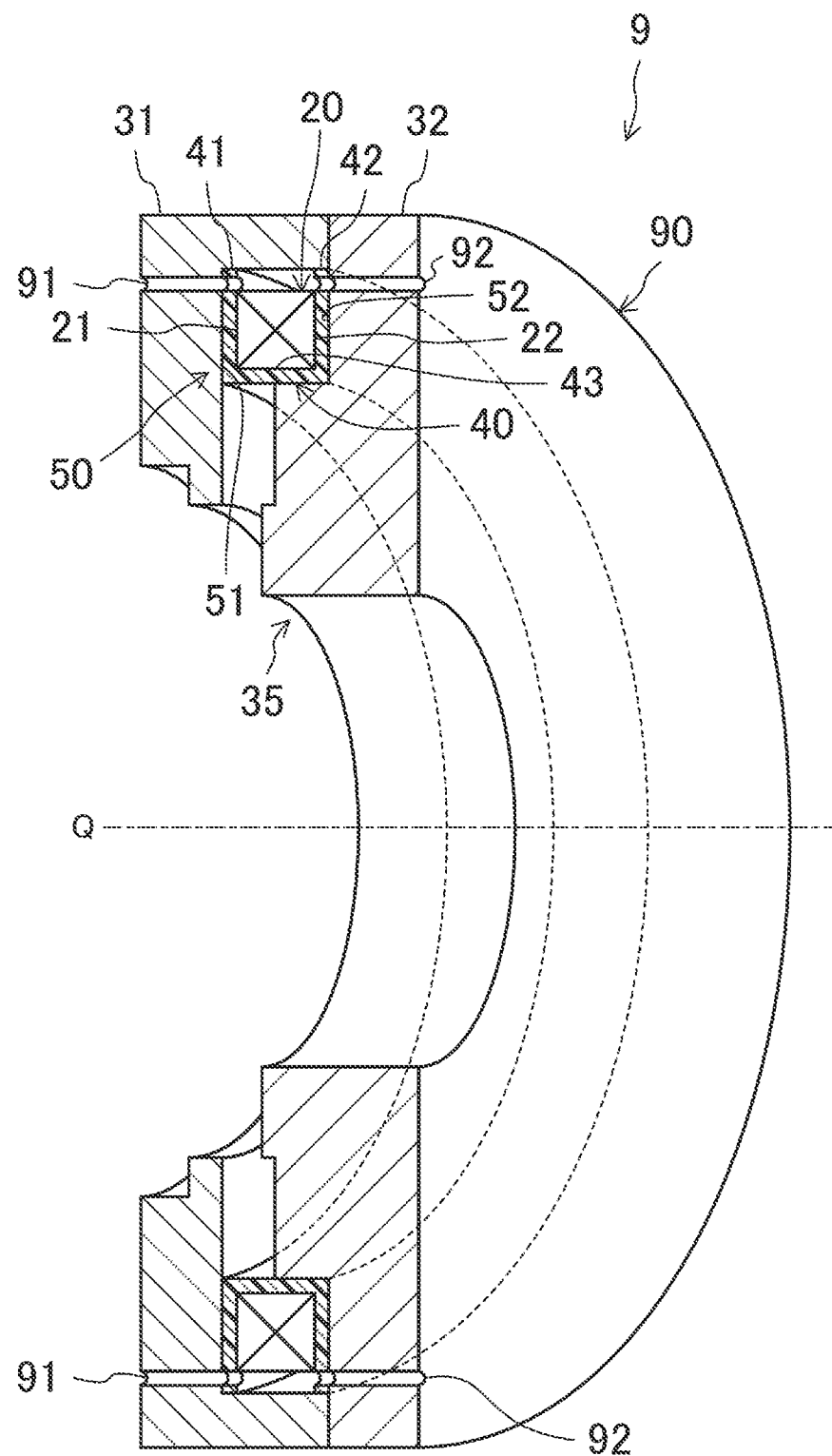
FIG. 3 is a sectional perspective view illustrating a configuration of a thrust magnetic bearing of a comparative example.

As illustrated in FIG. 3, the thrust magnetic bearing (9) is different from the thrust magnetic bearing (16) of the embodiment in a refrigerant inlet (91) and a refrigerant outlet (92). In a core (90) of the thrust magnetic bearing (9), the refrigerant outlet (92) is provided at a position where it is visible from the refrigerant inlet (91) when viewed in the axial direction (specifically, a position where it overlaps the refrigerant inlet (91)). Note that the other configurations of the thrust magnetic bearing (9) are the same as those of the thrust magnetic bearing (16) of the embodiment.

In the thrust magnetic bearing (9), the refrigerant outlet (92) is provided at a position where it is visible from the refrigerant inlet (91) when viewed in the axial direction. Thus, the refrigerant flowing into the gap between the radially outer side of the coil (20) and the core (90) through the refrigerant inlet (91) mainly flows linearly in the axial direction toward the refrigerant outlet (92). Therefore, the refrigerant flowing into the gap between the radially outer side of the coil (20) and the core (90) through the refrigerant inlet (91) is less likely to flow in the winding direction of the coil (20).

Effect of Embodiment

In the thrust magnetic bearing (16) of the embodiment, the refrigerant flow path (65) is formed so that the refrigerant flowing from the refrigerant inlet (61) toward the refrigerant outlet (62) mainly flows along the coil (20) in the winding direction of the coil (20). With such a configuration, the refrigerant can mainly flow along the coil (20) in the winding direction of the coil (20), and the coil (20) can be effectively cooled.

Further, in the thrust magnetic bearing (16) of the embodiment, the refrigerant flow path (65) includes the main flow path (66) extending along the coil (20) in the winding direction of the coil (20). The main flow path (66) allows the refrigerant to mainly flow along the coil (20) in the winding direction of the coil (20). In this manner, the coil (20) can be effectively cooled.

Further, in the thrust magnetic bearing (16) of the embodiment, the main flow path (66) includes the gap between the radially outer side of the coil (20) and the core (30). With such a configuration, the refrigerant can mainly flow through the gap between the radially outer side of the coil (20) and the core (30). Note that the gap between the radially outer side of the coil (20) and the core (30) extends along the coil (20) in the winding direction of the coil (20). Therefore, the refrigerant can mainly flow along the coil (20) in the winding direction of the coil (20), and thus the coil (20) can be effectively cooled.

Further, in the thrust magnetic bearing (16) of the embodiment, the refrigerant flow path (65) includes the main flow path (66), and the sub flow path (67) including the gap between the core (30) and the first wall portion (41) of the insulating member (40). The flow rate of the refrigerant in the main flow path (66) is larger than the flow rate of the refrigerant in the sub flow path (67). Therefore, the refrigerant can mainly flow along the coil (20) in the winding direction of the coil (20), and thus the coil (20) can be effectively cooled. Further, the coil (20) can be indirectly cooled by the refrigerant flowing through the sub flow path (67).

Further, in the thrust magnetic bearing (16) of the embodiment, the flow-path sectional area of the main flow path (66) is larger than the flow-path sectional area of the sub flow path (67). With the flow-path sectional area of the main flow path (66) being larger than the flow-path sectional area of the sub flow path (67), the flow rate of the refrigerant in the main flow path (66) can be larger than the flow rate of the refrigerant in the sub flow path (67). In this manner, the refrigerant can mainly flow along the coil (20) in the winding direction of the coil (20), and thus the coil (20) can be effectively cooled.

Further, in the thrust magnetic bearing (16) of the embodiment, the refrigerant outlet (62) is provided at a position different from a position where it is visible from the refrigerant inlet (61) when viewed in the axial direction. Such a configuration can prevent the refrigerant from flowing linearly in the axial direction from the refrigerant inlet (61) toward the refrigerant outlet (62). In this manner, the refrigerant easily flows along the coil (20) in the winding direction of the coil (20), and thus the coil (20) can be effectively cooled.

Further, in the thrust magnetic bearing (16) of the embodiment, the refrigerant flow path (65) faces the coil (20). With such a configuration, the coil (20) can be cooled more effectively than in the case where the refrigerant flow path (65) does not face the coil (20).

Further, in the thrust magnetic bearing (16) of the embodiment, the refrigerant pressure at the refrigerant inlet (61) is higher than the refrigerant pressure at the refrigerant outlet (62). The difference in refrigerant pressure between the refrigerant inlet (61) and the refrigerant outlet (62) allows the refrigerant to flow through the refrigerant flow path (65).

First Modification of Embodiment

Figure 4:
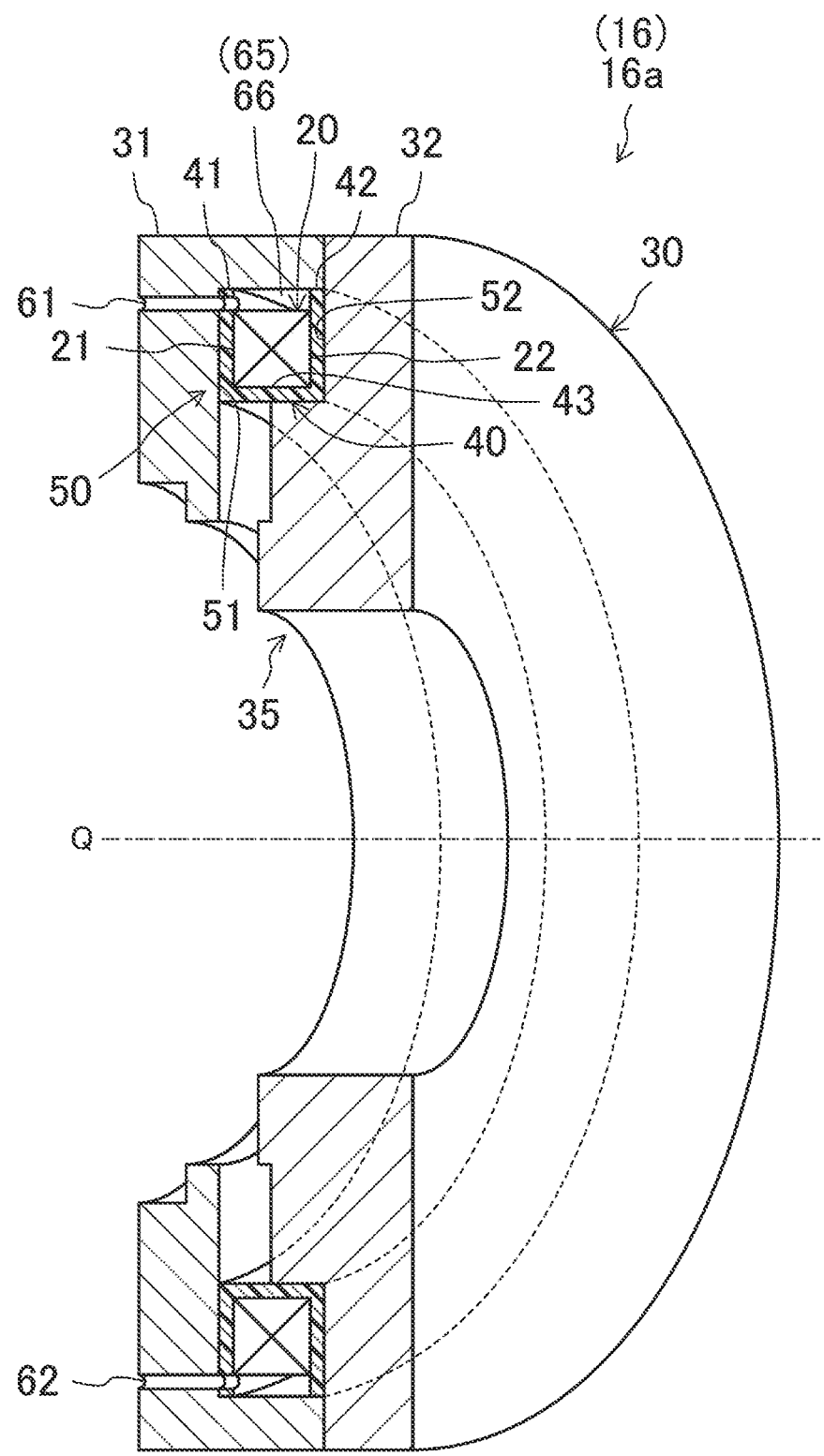
FIG. 4 is a sectional perspective view illustrating a configuration of a thrust magnetic bearing according to a first modification of the embodiment.

FIG. 4 illustrates a configuration of the thrust magnetic bearing (16) according to a first modification of the embodiment. The thrust magnetic bearing (16) according to the first modification of the embodiment is different from the thrust magnetic bearing (16) of the embodiment illustrated in FIG. 2 in the refrigerant outlet (62). The other configurations of the thrust magnetic bearing (16) according to the first modification of the embodiment are the same as those of the thrust magnetic bearing (16) of the embodiment.

In the first modification, the refrigerant outlet (62) is provided on one end side in the axial direction of the core (30). Specifically, the refrigerant outlet (62) passes through the first core (31) in the axial direction. The first wall portion (41) of the insulating member (40) is provided with a communication hole that allows the refrigerant outlet (62) to communicate with a gap between the radially outer side of the coil (20) and the radially outer side of the housing part (50).

Effect of First Modification of Embodiment

The thrust magnetic bearing (16) according to the first modification of the embodiment can exert the same effects as those of the thrust magnetic bearing (16) of the embodiment. For example, the refrigerant can mainly flow along the coil (20) in the winding direction of the coil (20), and thus the coil (20) can be effectively cooled.

Second Modification of Embodiment

Figure 5:
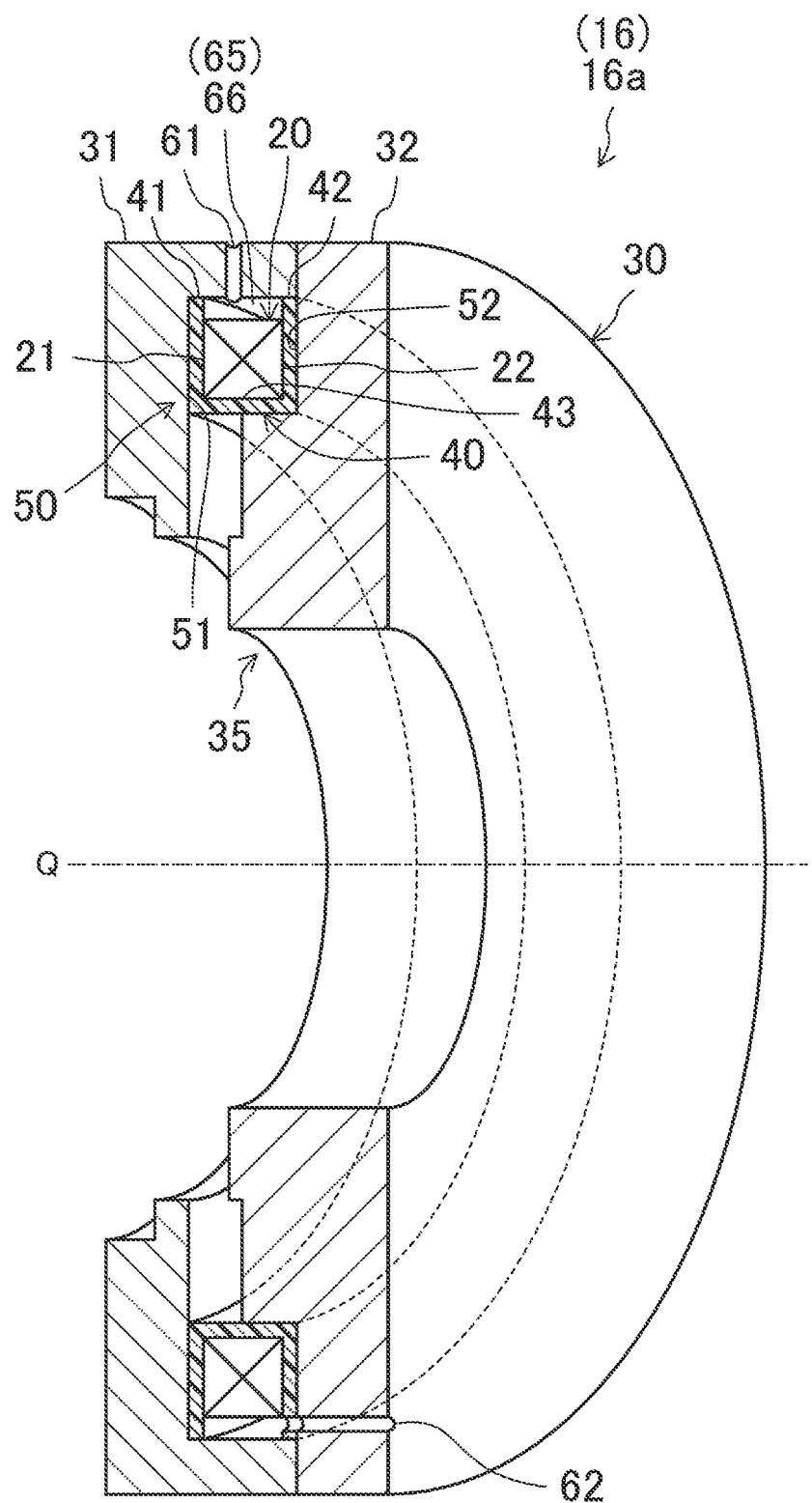
FIG. 5 is a sectional perspective view illustrating a configuration of a thrust magnetic bearing according to a second modification of the embodiment.

FIG. 5 illustrates a configuration of the thrust magnetic bearing (16) according to a second modification of the embodiment. The thrust magnetic bearing (16) according to the second modification of the embodiment is different from the thrust magnetic bearing (16) of the embodiment illustrated in FIG. 2 in the refrigerant inlet (61). The other configurations of the thrust magnetic bearing (16) according to the second modification of the embodiment are the same as those of the thrust magnetic bearing (16) of the embodiment.

In the second modification, the refrigerant inlet (61) is provided on a radially outer side of the core (30). Specifically, the refrigerant inlet (61) passes through the first core (31) in the radial direction and communicates with a gap between the radially outer side of the coil (20) and the core (30).

Effect of Second Modification of Embodiment

The thrust magnetic bearing (16) according to the second modification of the embodiment can exert the same effects as those of the thrust magnetic bearing (16) of the embodiment. For example, the refrigerant can mainly flow along the coil (20) in the winding direction of the coil (20), and thus the coil (20) can be effectively cooled.

Third Modification of Embodiment

Figure 6:
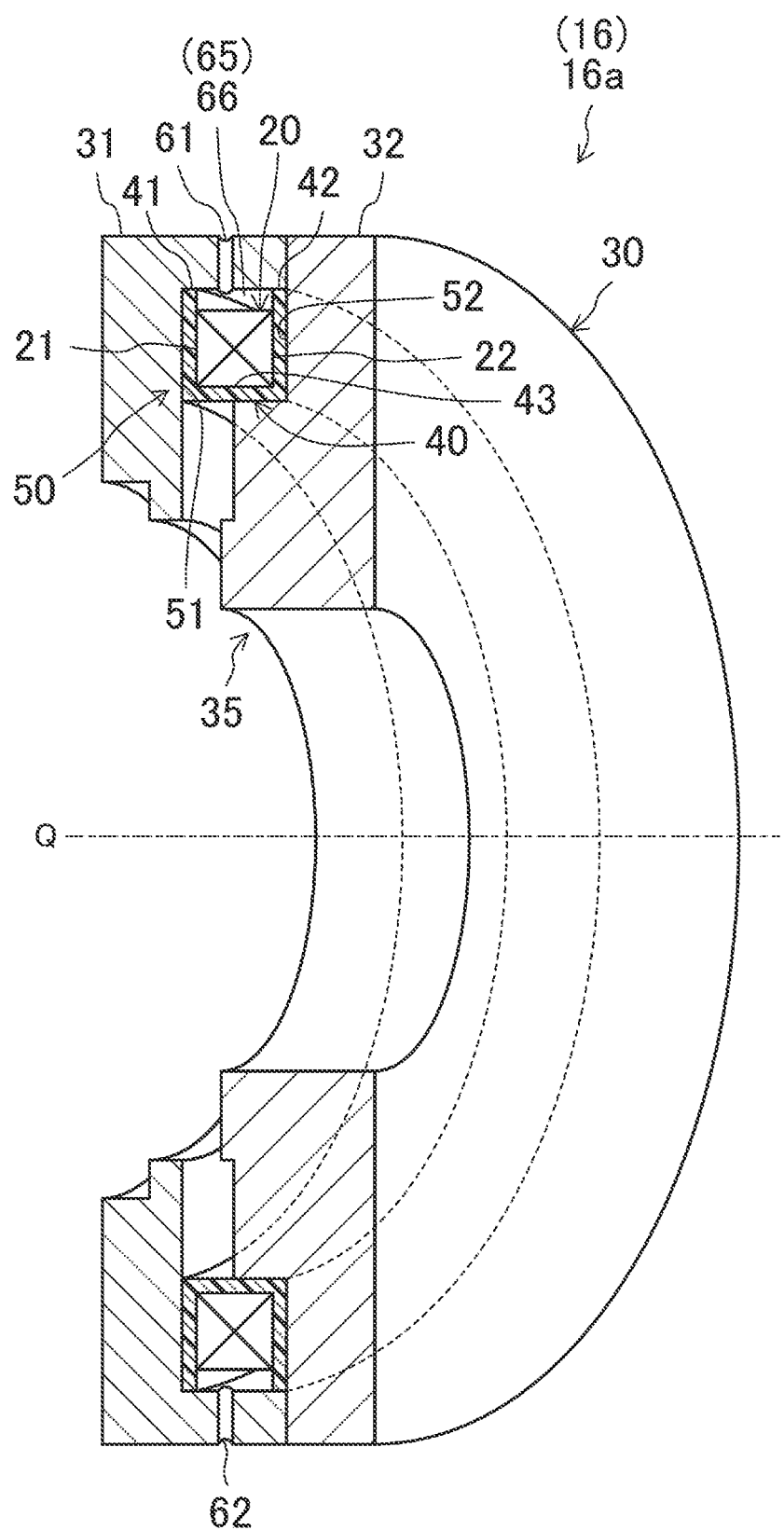
FIG. 6 is a sectional perspective view illustrating a configuration of a thrust magnetic bearing according to a third modification of the embodiment.

FIG. 6 illustrates a configuration of the thrust magnetic bearing (16) according to a third modification of the embodiment. The thrust magnetic bearing (16) according to the third modification of the embodiment is different from the thrust magnetic bearing (16) according to the second modification of the embodiment illustrated in FIG. 5 in the refrigerant outlet (62). The other configurations of the thrust magnetic bearing (16) according to the third modification of the embodiment are the same as those of the thrust magnetic bearing (16) according to the second modification of the embodiment.

In the third modification, the refrigerant outlet (62) is provided on the radially outer side of the core (30). Specifically, the refrigerant outlet (62) passes through the first core (31) in the radial direction and communicates with a gap between the radially outer side of the coil (20) and the core (30).

Effect of Third Modification of Embodiment

The thrust magnetic bearing (16) according to the third modification of the embodiment can exert the same effects as those of the thrust magnetic bearing (16) of the embodiment. For example, the refrigerant can mainly flow along the coil (20) in the winding direction of the coil (20), and thus the coil (20) can be effectively cooled.

Fourth Modification of Embodiment

Figure 7:
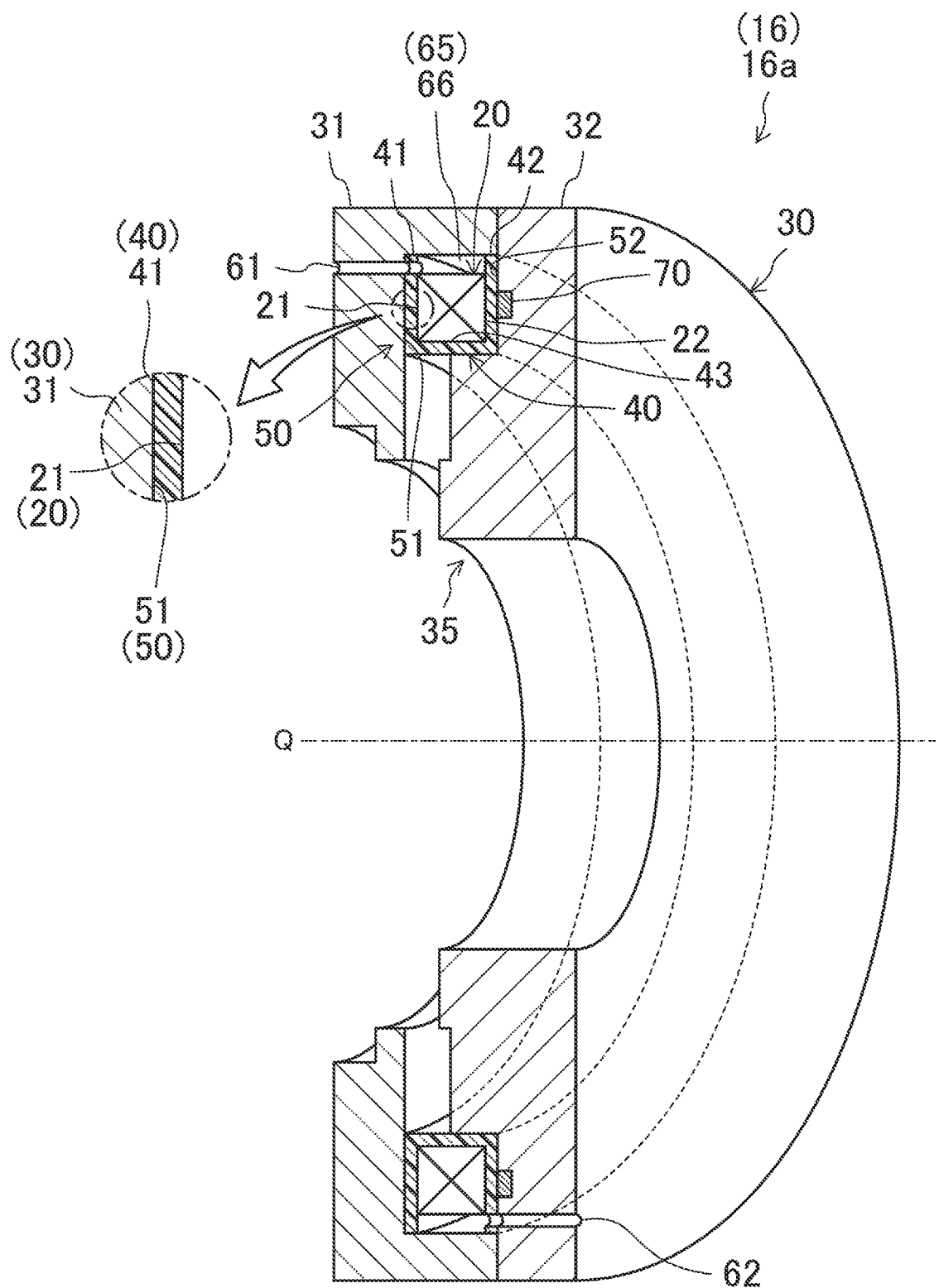
FIG. 7 is a sectional perspective view illustrating a configuration of a thrust magnetic bearing according to a fourth modification of the embodiment.

FIG. 7 illustrates a configuration of the thrust magnetic bearing (16) according to a fourth modification of the embodiment. The thrust magnetic bearing (16) according to the fourth modification of the embodiment includes a blocking member (70) in addition to the configuration of the thrust magnetic bearing (16) of the embodiment illustrated in FIG. 2.

The blocking member (70) blocks the flow of the refrigerant in the gap between the core (30) and the first wall portion (41) of the insulating member (40) disposed at the first end portion (21) of the coil (20).

In this example, the blocking member (70) is an elastic member having elasticity. The blocking member (70) is provided between the second wall portion (42) of the insulating member (40) and the second end portion (52) of the housing part (50). Then, the blocking member (70) presses the insulating member (40) toward the first end portion (51) of the housing part (50). This eliminates a gap between the first end portion (51) of the housing part (50) and the first wall portion (41) of the insulating member (40).

Effect of Fourth Modification of Embodiment

The thrust magnetic bearing (16) according to the fourth modification of the embodiment can exert the same effects as those of the thrust magnetic bearing (16) of the embodiment. For example, the refrigerant can mainly flow along the coil (20) in the winding direction of the coil (20), and thus the coil (20) can be effectively cooled.

Further, the thrust magnetic bearing (16) according to the fourth modification of the embodiment includes the blocking member (70) that blocks the flow of the refrigerant in the gap between the core (30) and the first wall portion (41) of the insulating member (40). The refrigerant easily flows through the main flow path (66) by blocking the flow of the refrigerant in the gap between the core (30) and the first wall portion (41) of the insulating member (40). This facilitates the refrigerant to mainly flow along the coil (20) in the winding direction of the coil (20), thereby making it easier for the coil (20) to be effectively cooled.

Note that the blocking member (70) may be a sealing member that seals the gap between the core (30) and the first wall portion (41) of the insulating member (40). In this case, the blocking member (70) is provided between the first end portion (51) of the housing part (50) and the first wall portion (41) of the insulating member (40), thereby eliminating the gap between the first end portion (51) of the housing part (50) and the first wall portion (41) of the insulating member (40). This structure can also block the flow of the refrigerant in the gap between the core (30) and the first wall portion (41) of the insulating member (40).

Fifth Modification of Embodiment

Figure 8:
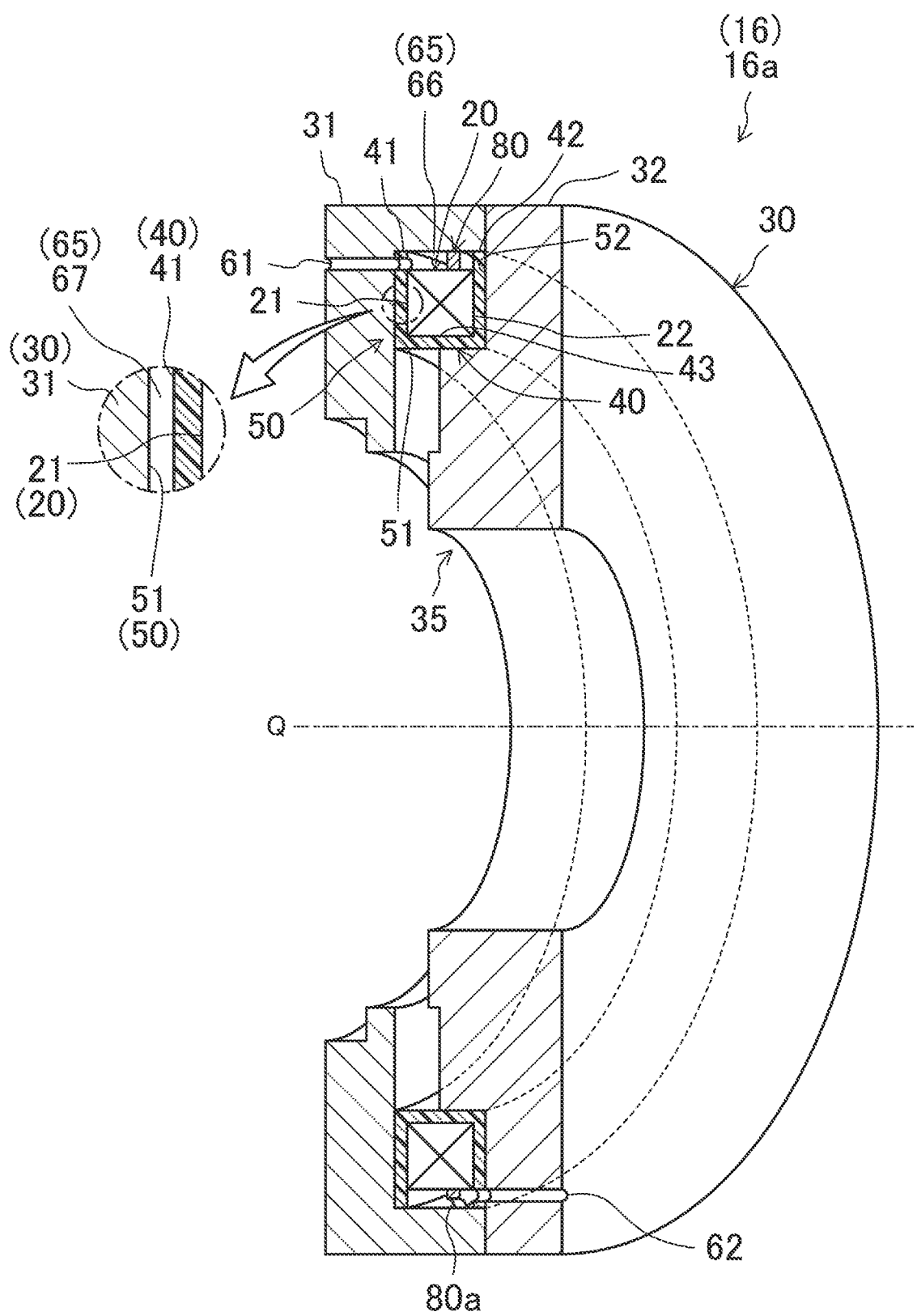
FIG. 8 is a sectional perspective view illustrating a configuration of a thrust magnetic bearing according to a fifth modification of the embodiment.

FIG. 8 illustrates a configuration of the thrust magnetic bearing (16) according to a fifth modification of the embodiment. The thrust magnetic bearing (16) according to the fifth modification of the embodiment includes a partition plate (80) in addition to the configuration of the thrust magnetic bearing (16) of the embodiment illustrated in FIG. 2.

As illustrated in FIG. 8, the partition plate (80) is provided in the gap between the radially outer side of the coil (20) and the core (30). In this example, the partition plate (80) divides the gap between the radially outer side of the coil (20) and the core (30) in the axial direction. The partition plate (80) is provided with a cutout (80a). The cutout (80a) allows the refrigerant to pass in the axial direction.

Figure 9:
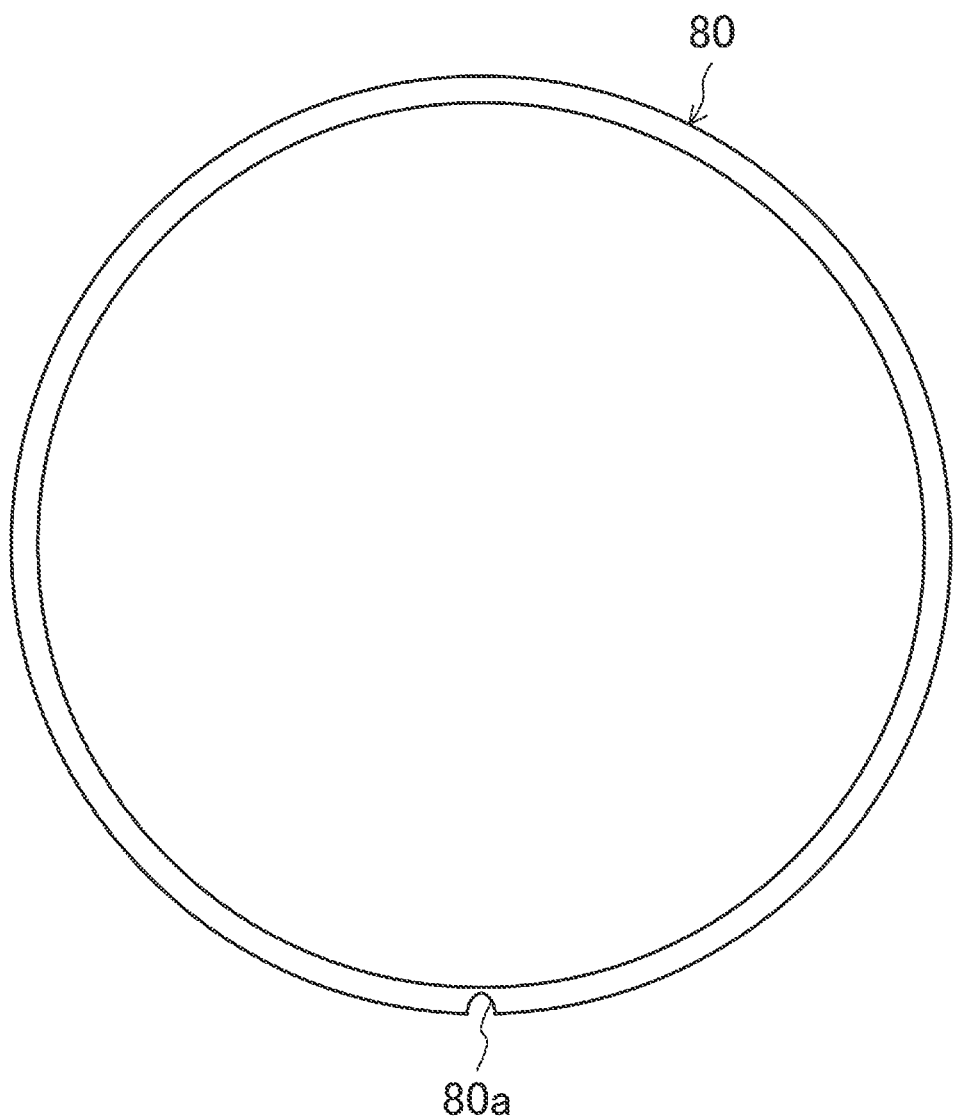
FIG. 9 is a plan view illustrating a configuration of a partition plate according to the fifth modification of the embodiment.

As illustrated in FIG. 9, the partition plate (80) is formed annularly. As illustrated in FIG. 8, the partition plate (80) extends from the radially outer side (outer peripheral surface in this example) of the coil (20) to the radially outer side (outer peripheral surface in this example) of the housing part (50). The partition plate (80) divides the gap between the radially outer side of the coil (20) and the radially outer side of the housing part (50) in the axial direction over the entire circumference in the winding direction.

In the fifth modification, the main flow path (66) includes a portion of the gap between the radially outer side of the coil (20) and the core (30), the portion being interposed between the partition plate (80) and the first end portion (51) of the housing part (50). Note that the configuration of the sub flow path (67) in the fifth modification is the same as that of the sub flow path (67) in the embodiment illustrated in FIG. 2.

Further, in the fifth modification, at least one of the refrigerant inlet (61) and the refrigerant outlet (62) is provided at a position different from a position where it overlaps the cutout (80a) when viewed in the axial direction. In this example, the refrigerant outlet (62) is provided at a position where it overlaps the cutout (80a) when viewed in the axial direction. The refrigerant inlet (61) is provided at a position different from a position where it overlaps the cutout (80a) when viewed in the axial direction. For example, the refrigerant inlet (61) is disposed at a position deviated by 90° or more from the position of the refrigerant outlet (62) with the winding axis (Q) as a center. In the example of FIG. 8, the refrigerant inlet (61) is disposed at a position deviated by 180° from the position of the refrigerant outlet (62) with the winding axis (Q) as a center.

Flow of Refrigerant

The following will describe the flow of a refrigerant in the thrust magnetic bearing (16) according to the fifth modification of the embodiment.

The refrigerant flowing into the refrigerant flow path (65) through the refrigerant inlet (61) mainly flows through the main flow path (66). In the main flow path (66), the refrigerant flows along the coil (20) in the winding direction of the coil (20). Thus, the coil (20) is cooled. The refrigerant in the main flow path (66) flows out through the cutout (80a) of the partition plate (80) and the refrigerant outlet (62).

Further, part of the refrigerant flowing into the refrigerant flow path (65) through the refrigerant inlet (61) flows through the sub flow path (69). Note that the flow rate of the refrigerant flowing through the sub flow path (67) is smaller than the flow rate of the refrigerant flowing through the main flow path (66). In the sub flow path (67), the refrigerant flows along the coil (20) in the winding direction of the coil (20). In this manner, the first wall portion (41) of the insulating member (40) is cooled, and the coil (20) is indirectly cooled. Then, the refrigerant in the sub flow path (67) flows out through the cutout (80a) of the partition plate (80) and the refrigerant outlet (62).

Effect of Fifth Modification of Embodiment

The thrust magnetic bearing (16) according to the fifth modification of the embodiment can exert the same effects as those of the thrust magnetic bearing (16) of the embodiment. For example, the refrigerant can mainly flow along the coil (20) in the winding direction of the coil (20), and thus the coil (20) can be effectively cooled.

Further, the thrust magnetic bearing (16) according to the fifth modification of the embodiment includes the partition plate (80) provided in the gap between the radially outer side of the coil (20) and the core (30). Such a configuration can adjust the flow of the refrigerant in the gap between the radially outer side of the coil (20) and the core (30).

Further, in the thrust magnetic bearing (16) according to the fifth modification of the embodiment, the partition plate (80) divides the gap between the radially outer side of the coil (20) and the core (30) in the axial direction. The partition plate (80) is provided with the cutout (80a) through which the refrigerant passes in the axial direction. At least one of the refrigerant inlet (61) and the refrigerant outlet (62) is provided at a position different from a position where it overlaps the cutout (80a) when viewed in the axial direction. Such a configuration can prevent the refrigerant from flowing linearly in the axial direction from the refrigerant inlet (61) toward the refrigerant outlet (62). In this manner, the refrigerant easily flows along the coil (20) in the winding direction of the coil (20), and thus the coil (20) can be effectively cooled.

Sixth Modification of Embodiment

Figure 10:
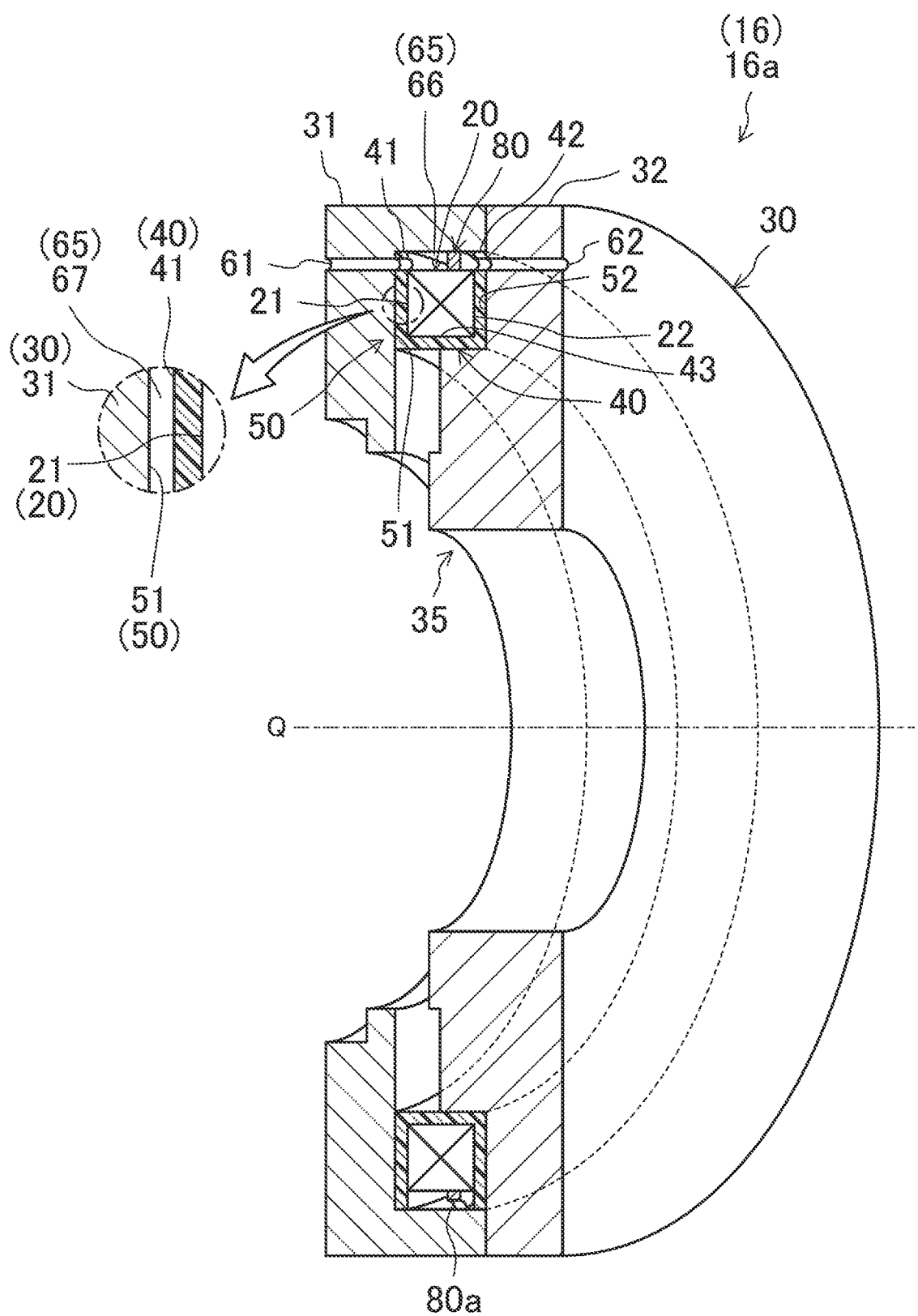
FIG. 10 is a sectional perspective view illustrating a configuration of a thrust magnetic bearing according to a sixth modification of the embodiment.

FIG. 10 illustrates a configuration of the thrust magnetic bearing (16) according to a sixth modification of the embodiment. The thrust magnetic bearing (16) according to the sixth modification of the embodiment is different from the thrust magnetic bearing (16) according to the fifth modification of the embodiment illustrated in FIG. 8 in the refrigerant outlet (62). The other configurations of the thrust magnetic bearing (16) according to the sixth modification of the embodiment are the same as those of the thrust magnetic bearing (16) according to the fifth modification of the embodiment.

In the sixth modification, the refrigerant inlet (61) and the refrigerant outlet (62) are provided at positions different from positions where they overlap the cutout (80a) when viewed in the axial direction. For example, the refrigerant inlet (61) and the refrigerant outlet (62) are disposed at positions deviated by 90° or more from the position of the cutout (80a) of the partition plate (80) with the winding axis (Q) as a center. In the example of FIG. 10, the refrigerant inlet (61) and the refrigerant outlet (62) are disposed at positions deviated by 180° from the position of the cutout (80a) of the partition plate (80) with the winding axis (Q) as a center.

Further, in the sixth modification, the refrigerant outlet (62) is provided at a position where it overlaps the refrigerant inlet (61) when viewed in the axial direction. Note that the partition plate (80) is provided between the refrigerant inlet (61) and the refrigerant outlet (62). With such a configuration, the refrigerant outlet (62) is provided at a position where it overlaps the refrigerant inlet (61) when viewed in the axial direction, but the refrigerant outlet (62) is not visible from the refrigerant inlet (61) due to the partition plate (80), thereby preventing the refrigerant from flowing linearly in the axial direction from the refrigerant inlet (61) toward the refrigerant outlet (62).

Further, in the sixth modification, the partition plate (80) divides the gap between the radially outer side of the coil (20) and the core (30) in the axial direction, thereby dividing the gap between the radially outer side of the coil (20) and the core (30) into a plurality of flow paths. The plurality of flow paths extend along the coil (20) in the winding direction of the coil (20) and communicate with each other through the cutout (80a) of the partition plate (80). The main flow path (66) includes the plurality of flow paths.

Flow of Refrigerant

The following will describe the flow of a refrigerant in the thrust magnetic bearing (16) according to the sixth modification of the embodiment.

The refrigerant flowing into the refrigerant flow path (65) through the refrigerant inlet (61) mainly flows through the main flow path (66). In the main flow path (66), the refrigerant flows along the coil (20) in the winding direction of the coil (20) from the refrigerant inlet (61) to the cutout (80a) of partition plate (80) and passes the cutout (80a) of the partition plate (80) in the axial direction. Thus, the coil (20) is cooled. The refrigerant having passed the cutout (80a) of the partition plate (80) flows along the coil (20) in the winding direction of the coil (20) from the cutout (80a) of the partition plate (80) toward the refrigerant outlet (62). Thus, the coil (20) is cooled. Then, the refrigerant in the main flow path (66) flows out through the refrigerant outlet (62).

Effect of Sixth Modification of Embodiment

The thrust magnetic bearing (16) according to the sixth modification of the embodiment can exert the same effects as those of the thrust magnetic bearing (16) according to the fifth modification of the embodiment. For example, the refrigerant can mainly flow along the coil (20) in the winding direction of the coil (20), and thus the coil (20) can be effectively cooled.

Further, in the thrust magnetic bearing (16) according to the sixth modification of the embodiment, the partition plate (80) divides the gap between the radially outer side of the coil (20) and the core (30) into a plurality of flow paths. Such a configuration can suppress an uneven flow of the refrigerant in the gap between the radially outer side of the coil (20) and the core (30).

Seventh Modification of Embodiment

Figure 11:
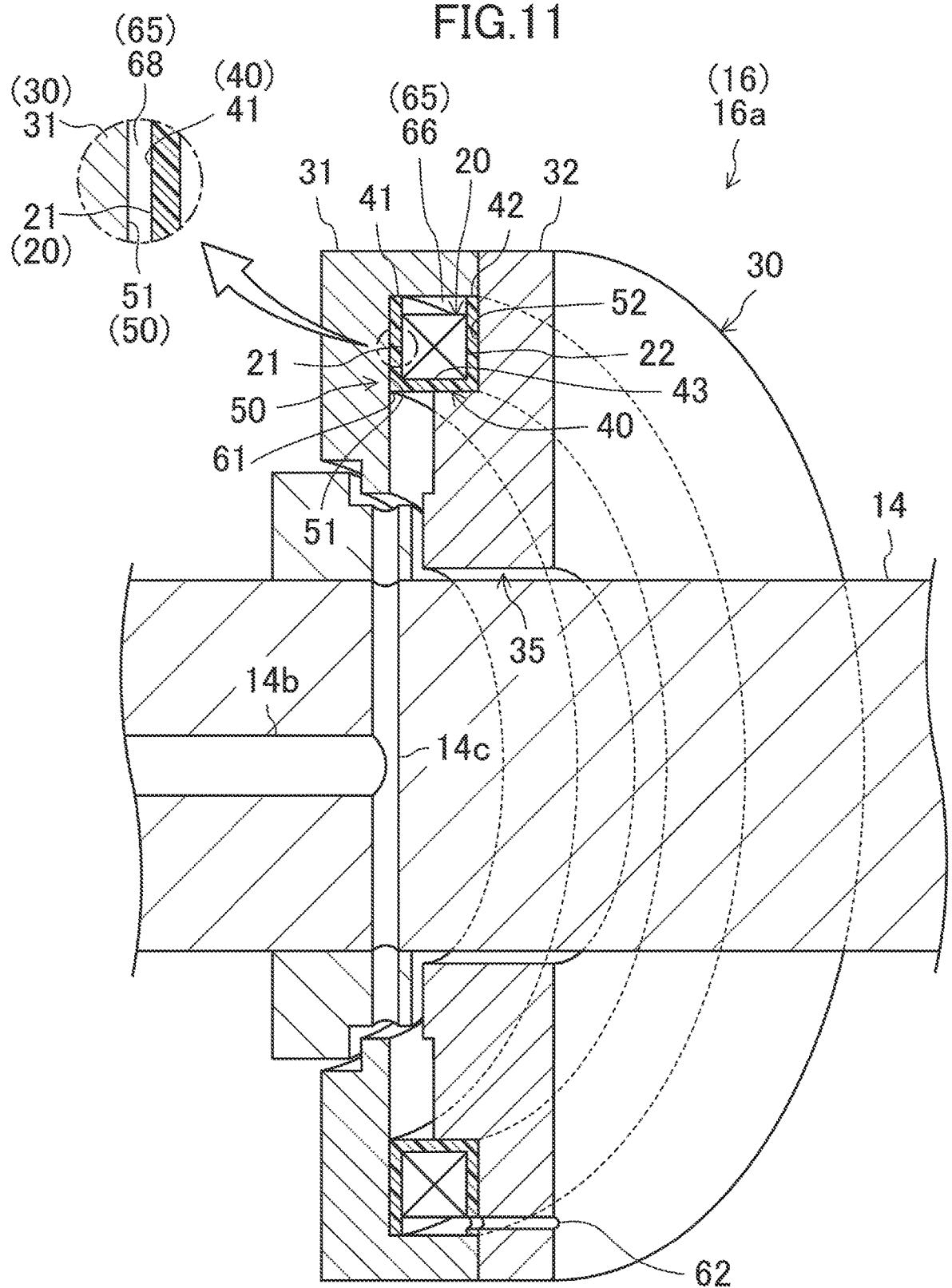
FIG. 11 is a sectional perspective view illustrating a configuration of a thrust magnetic bearing according to a seventh modification of the embodiment.

FIG. 11 illustrates a configuration of the thrust magnetic bearing (16) according to a seventh modification of the embodiment. The thrust magnetic bearing (16) according to the seventh modification of the embodiment is different from the thrust magnetic bearing (16) of the embodiment illustrated in FIG. 2 in the refrigerant inlet (61) and the refrigerant flow path (65). The other configurations of the thrust magnetic bearing (16) according to the seventh modification of the embodiment are the same as those of the thrust magnetic bearing (16) of the embodiment.

As illustrated in FIG. 11, a refrigerant flows in the shaft (14) supported in a non-contact manner by the thrust magnetic bearing (16) according to the seventh modification of the embodiment. This shaft (14) can radially discharge, by rotation, the refrigerant. Specifically, the shaft (14) is provided with a first flow path (14b) extending in the extending direction of the shaft (14) and a second flow path (14c) extending in a direction orthogonal to the extending direction of the shaft (14). The refrigerant flows through the first flow path (14b) and the second flow path (14c). When the shaft (14) rotates, the refrigerant is radially discharged from the first flow path (14b) through the second flow path (14c) by a centrifugal pump effect.

Figure 12:
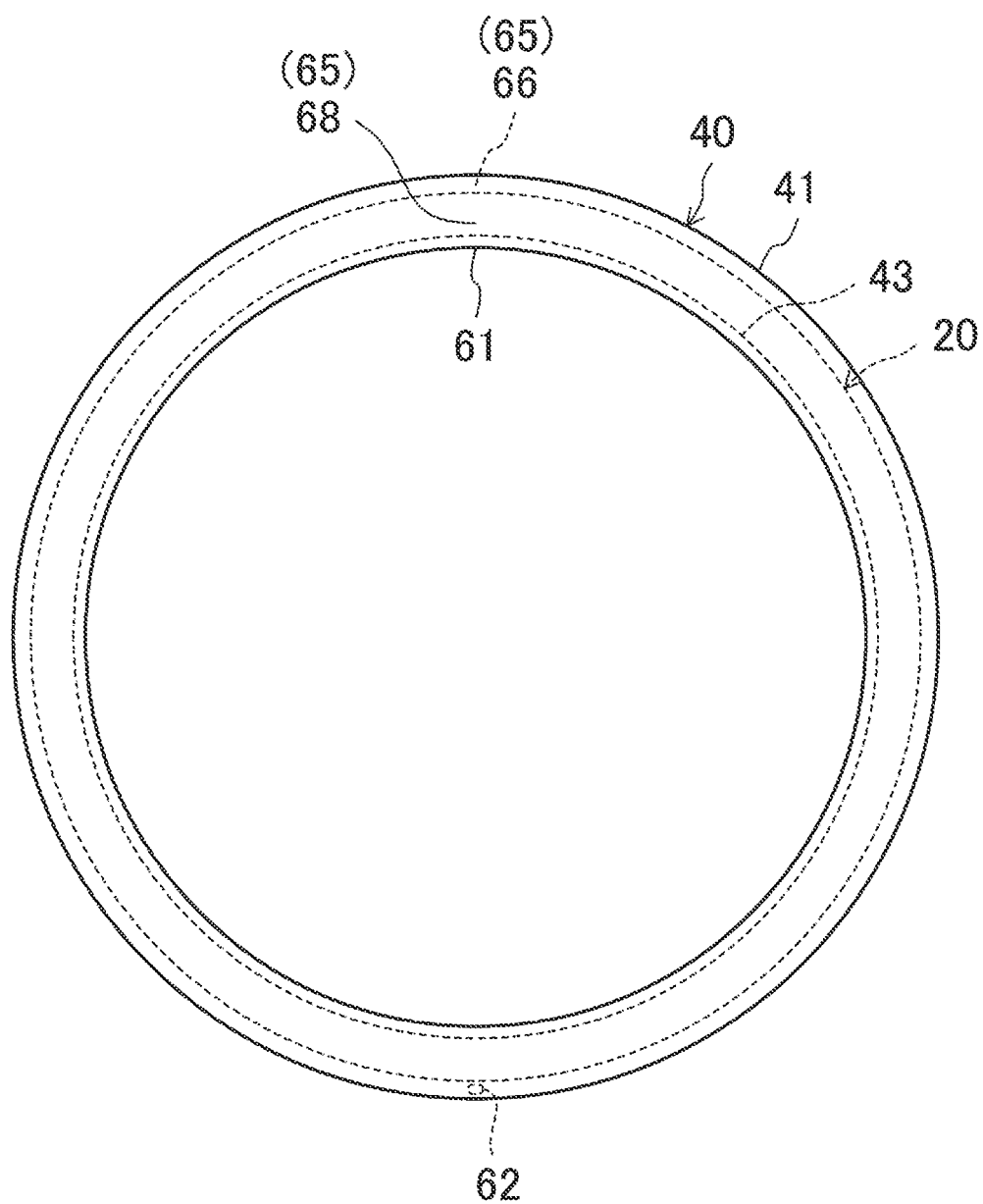
FIG. 12 is a plan view illustrating a configuration of an insulating member according to the seventh modification of the embodiment.

In the seventh modification, the refrigerant inlet (61) is open on the inner peripheral surface of the through-hole (35). In this example, an end portion in the radial direction of the gap between the core (30) and the first wall portion (41) of the insulating member (40) forms the refrigerant inlet (61). As illustrated in FIG. 12, the refrigerant inlet (61) is formed over the entire circumference in the winding direction of the coil (20).

Further, in the seventh modification, the refrigerant flow path (65) includes the main flow path (66) and the communication flow path (68). Note that the configuration of the main flow path (66) in the seventh modification is the same as that of the main flow path (66) in the embodiment illustrated in FIG. 2.

As illustrated in FIG. 11, the communication flow path (68) includes a gap between the core (30) and the first wall portion (41) of the insulating member (40) disposed at the first end portion (21) of the coil (20). The communication flow path (68) connects the refrigerant inlet (61) and the main flow path (66). As illustrated in FIG. 12, the communication flow path (68) is formed over the entire circumference in the winding direction of the coil (20).

Flow of Refrigerant

The following will describe the flow of a refrigerant in the thrust magnetic bearing (16) according to the seventh modification of the embodiment.

The refrigerant discharged from the shaft (14) flows into the communication flow path (68) through the refrigerant inlet (61). In the communication flow path (68), the refrigerant flows radially outward and flows into the main flow path (66). In the main flow path (66), the refrigerant flows along the coil (20) in the winding direction of the coil (20). Thus, the coil (20) is cooled. The refrigerant in the main flow path (66) flows out through the refrigerant outlet (62).

Effect of Seventh Modification of Embodiment

The thrust magnetic bearing (16) according to the seventh modification of the embodiment can exert the same effects as those of the thrust magnetic bearing (16) of the embodiment. For example, the refrigerant can mainly flow along the coil (20) in the winding direction of the coil (20), and thus the coil (20) can be effectively cooled.

Further, in the thrust magnetic bearing (16) according to the seventh modification of the embodiment, the shaft (14) that can radially discharge, by rotation, the refrigerant flowing therein is inserted into the through-hole (35). The refrigerant inlet (61) is open on the inner peripheral surface of the through-hole (35). With such a configuration, the refrigerant discharged from the shaft (14) flows into the refrigerant flow path (65) through the refrigerant inlet (61) that is open on the inner peripheral surface of the through-hole (35). In this manner, it is possible to effectively cool the coil (20) with the refrigerant discharged from the shaft (14).

Further, in the thrust magnetic bearing (16) according to the seventh modification of the embodiment, the refrigerant flow path (65) includes the main flow path (66), and the communication flow path (68) including the gap between the core (30) and the first wall portion (41) of the insulating member (40) and connecting the refrigerant inlet (61) and the main flow path (66). Such a configuration allows the refrigerant to flow from the refrigerant inlet (61) to the main flow path (66) through the gap between the core (30) and the first wall portion (41) of the insulating member (40).

Eighth Modification of Embodiment

Figure 13:
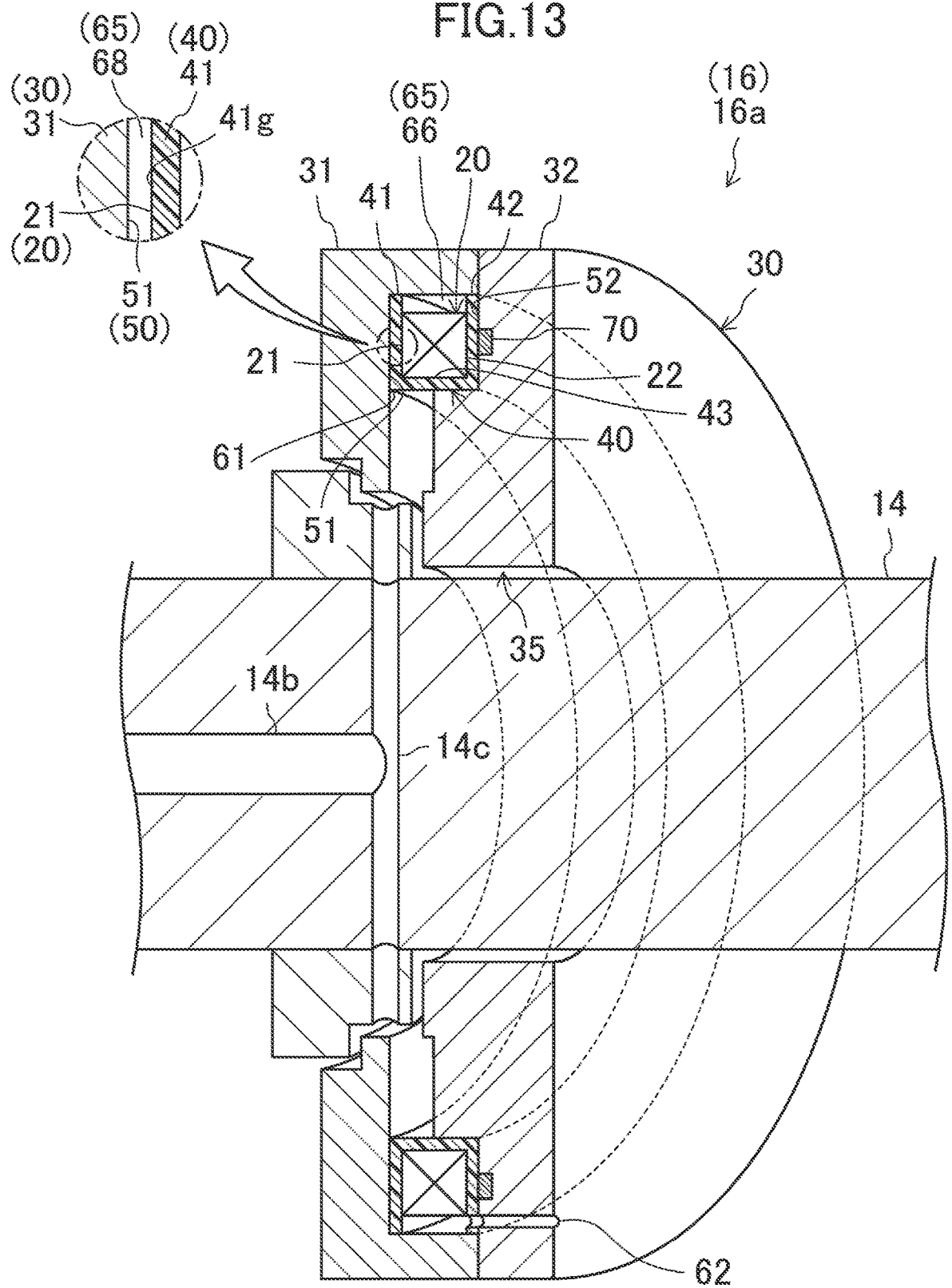
FIG. 13 is a sectional perspective view illustrating a configuration of a thrust magnetic bearing according to an eighth modification of the embodiment.

FIG. 13 illustrates a configuration of the thrust magnetic bearing (16) according to an eighth modification of the embodiment. The thrust magnetic bearing (16) according to the eighth modification of the embodiment includes the blocking member (70) in addition to the configuration of the thrust magnetic bearing (16) according to the seventh modification of the embodiment illustrated in FIG. 11. Further, the thrust magnetic bearing (16) according to the eighth modification of the embodiment is different from the thrust magnetic bearing (16) according to the seventh modification of the embodiment illustrated in FIG. 11 in the insulating member (40). The other configurations of the thrust magnetic bearing (16) according to the eighth modification of the embodiment are the same as those of the thrust magnetic bearing (16) according to the seventh modification of the embodiment.

In the eighth modification, the blocking member (70) blocks the flow of the refrigerant in the gap between the core (30) and the first wall portion (41) of the insulating member (40). In this example, the blocking member (70) is an elastic member having elasticity. The blocking member (70) is provided between the second wall portion (42) of the insulating member (40) and the second end portion (52) of the housing part (50). Then, the blocking member (70) presses the insulating member (40) toward the first end portion (51) of the housing part (50). This eliminates the gap between the first end portion (51) of the housing part (50) and the first wall portion (41) of the insulating member (40).

Figure 14:
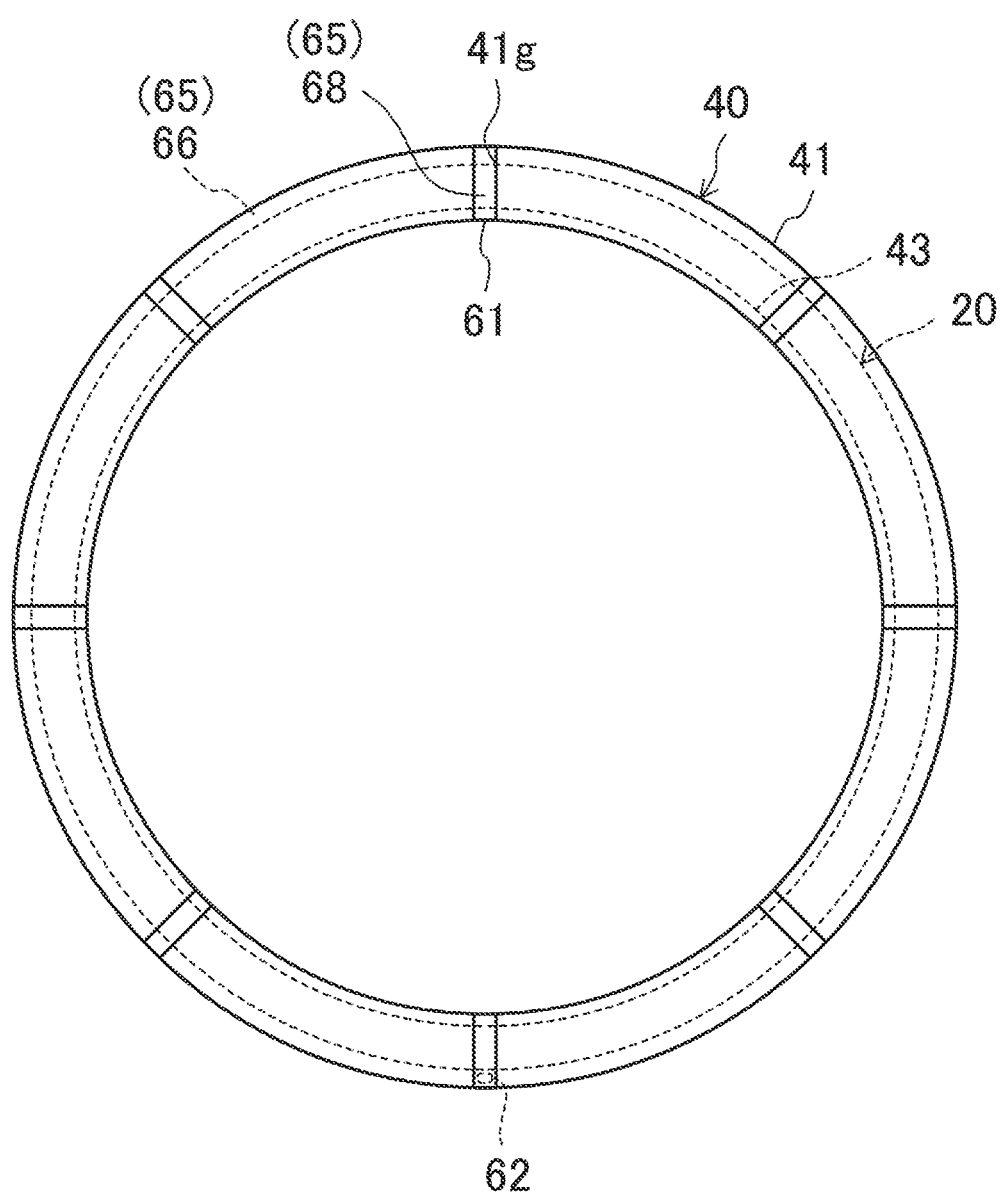
FIG. 14 is a plan view illustrating a configuration of an insulating member according to the eighth modification of the embodiment.

Further, in the eighth modification, a groove (41g) extending radially is provided in a surface of the first wall portion (41) of the insulating member (40) disposed at the first end portion (21) of the coil (20), the surface facing the core (30). As illustrated in FIG. 14, the groove (41g) includes a plurality of grooves (41g) in this example.

Further, in the eighth modification, the refrigerant flow path (65) includes the main flow path (66) and the communication flow path (68). Note that the configuration of the main flow path (66) in the eighth modification is the same as that of the main flow path (66) in the embodiment illustrated in FIG. 2.

As illustrated in FIGS. 13 and 14, the communication flow path (68) includes the groove (41g) of the first wall portion (41) of the insulating member (40). The communication flow path (68) connects the refrigerant inlet (61) and the main flow path (66).

Effect of Eighth Modification of Embodiment

The thrust magnetic bearing (16) according to the eighth modification of the embodiment can exert the same effects as those of the thrust magnetic bearing (16) according to the seventh modification of the embodiment. For example, the refrigerant can mainly flow along the coil (20) in the winding direction of the coil (20), and thus the coil (20) can be effectively cooled.

Further, in the thrust magnetic bearing (16) according to the eighth modification of the embodiment, the refrigerant flow path (65) includes the main flow path (66), and the communication flow path (68) including the groove (41g) of the first wall portion (41) of the insulating member (40) and connecting the refrigerant inlet (61) and the main flow path (66). Such a configuration allows the refrigerant to flow from the refrigerant inlet (61) to the main flow path (66) through the groove (41g) of the first wall portion (41) of the insulating member (40).

Ninth Modification of Embodiment

FIG. 15 illustrates a configuration of the thrust magnetic bearing (16) according to a ninth modification of the embodiment. The thrust magnetic bearing (16) according to the ninth modification of the embodiment includes a first partition plate (81) and a second partition plate (82) in addition to the configuration of the thrust magnetic bearing (16) of the embodiment illustrated in FIG. 2.

As illustrated in FIG. 15, the first partition plate (81) and the second partition plate (82) are provided in the gap between the radially outer side of the coil (20) and the core (30). In this example, the first partition plate (81) and the second partition plate (82) divide the gap between the radially outer side of the coil (20) and the core (30) in the winding direction, thereby dividing the gap between the radially outer side of the coil (20) and the core (30) into a plurality of flow paths (66a). The plurality of flow paths (66a) extend along the coil (20) in the winding direction of the coil (20). The main flow path (66) includes the plurality of flow paths (66a).

Specifically, the first partition plate (81) is formed in a rectangular shape. The first partition plate (81) extends from the radially outer side (outer peripheral surface in this example) of the coil (20) to the radially outer side (outer peripheral surface in this example) of the housing part (50). The first partition plate (81) divides the gap between the radially outer side of the coil (20) and the radially outer side of the housing part (50) in the winding direction over the entire space in the axial direction. The configuration of the second partition plate (82) is the same as that of the first partition plate (81). The second partition plate (82) is disposed at a position deviated by 180° from the position of the first partition plate (81) with the winding axis (Q) as a center. Such a configuration divides the gap between the radially outer side of the coil (20) and the radially outer side of the housing part (50) into two flow paths (66a).

In the ninth modification, a plurality of refrigerant inlets (61) are provided near the first partition plate (81), and a plurality of refrigerant outlets (62) are provided near the second partition plate (82). Specifically, two refrigerant inlets (61) corresponding to the two flow paths (66a) and two refrigerant outlets (62) corresponding to the two flow paths (66a) are provided.

Flow of Refrigerant

The following will describe the flow of a refrigerant in the thrust magnetic bearing (16) according to the ninth modification of the embodiment. Hereinafter, one of the two flow paths (66a) is referred to as a "first flow path (66a)", and the other of the two flow paths (66a) is referred to as a "second flow path (66a)". The refrigerant inlet (61) and the refrigerant outlet (62) corresponding to the first flow path (66a) are referred to as a "first refrigerant inlet (61)" and a "first refrigerant outlet (62)", respectively, and the refrigerant inlet (61) and the refrigerant outlet (62) corresponding to the second flow path (66a) are referred to as a "second refrigerant inlet (61)" and a "second refrigerant outlet (62)", respectively.

The refrigerant having flowed into the first flow path (66a) through the first refrigerant inlet (61) flows along the coil (20) in the winding direction of the coil (20) (for example, clockwise in FIG. 15). As a result, a half of the coil (20) is cooled. Then, the refrigerant in the first flow path (66a) flows out through the first refrigerant outlet (62).

The refrigerant having flowed into the second flow path (66a) through the second refrigerant inlet (61) flows along the coil (20) in the winding direction of the coil (20) (for example, counterclockwise in FIG. 15). As a result, the other half of the coil (20) is cooled. Then, the refrigerant in the second flow path (66a) flows out through the second refrigerant outlet (62).

Effect of Ninth Modification of Embodiment

The thrust magnetic bearing (16) according to the ninth modification of the embodiment can exert the same effects as those of the thrust magnetic bearing (16) of the embodiment. For example, the refrigerant can mainly flow along the coil (20) in the winding direction of the coil (20), and thus the coil (20) can be effectively cooled.

Further, the thrust magnetic bearing (16) according to the ninth modification of the embodiment includes the first partition plate (81) and the second partition plate (82) provided in the gap between the radially outer side of the coil (20) and the core (30). Such a configuration can adjust the flow of the refrigerant in the gap between the radially outer side of the coil (20) and the core (30).

Further, in the thrust magnetic bearing (16) according to the ninth modification of the embodiment, the first partition plate (81) and the second partition plate (82) divide the gap between the radially outer side of the coil (20) and the core (30) into a plurality of flow paths (66a). Such a configuration can suppress an uneven flow of the refrigerant in the gap between the radially outer side of the coil (20) and the core (30).

Further, in the thrust magnetic bearing (16) of the ninth modification of the embodiment, the first partition plate (81) and the second partition plate (82) divide the gap between the radially outer side of the coil (20) and the core (30) in the winding direction. Such a configuration can suppress an uneven flow of the refrigerant in the winding direction in the gap between the radially outer side of the coil (20) and the core (30).

OTHER EMBODIMENTS

The coil (20) in the above description may be exposed or may be covered with potting resin or the like.

Further, the coil (20) housed in the core (30) in the above description may be completely surrounded by the core (30) or may not be completely surrounded by the core (30).

Further, the above description exemplifies the case where the core (30) is formed by the first core (31) and the second core (32) that are annularly formed and disposed in the axial direction, but the configuration is not limited thereto. For example, the core (30) may be formed by a combination of cores having other shapes such as a U-shaped core and an L-shaped core.

Further, the above description exemplifies the case where the refrigerant is caused to flow through the refrigerant flow path (65) by the pressure difference of the refrigerant between the refrigerant inlet (61) and the refrigerant outlet (62), but the configuration is not limited thereto. For example, the refrigerant may be caused to flow through the refrigerant flow path (65) by the difference in height between the refrigerant inlet (61) and the refrigerant outlet (62).

Further, the state of the refrigerant may be gas, liquid, or a gas-liquid two phase state.

Further, the above description exemplifies the case where two flow paths are formed by the partition plates (80, 81, 82), but the configuration is not limited thereto. Three or more flow paths may be formed by the partition plates (80, 81, 82).

Further, while the embodiment and the modifications have been described, it will be understood that various changes in form and details may be made therein without departing from the spirit and scope of the claims. Further, the above-described embodiment and modifications may be appropriately combined or replaced as long as the functions of the object of the present disclosure are not impaired.

As described above, the present disclosure is useful as a thrust magnetic bearing.

The invention claimed is:

1. A thrust magnetic bearing, comprising:
 a coil formed by winding a conductive wire;
 a core that houses the coil, the core being provided with a refrigerant inlet and a refrigerant outlet;
 a refrigerant flow path connecting the refrigerant inlet and the refrigerant outlet, the refrigerant flow path being provided between the coil and the core, and the refrigerant flow path including a main flow path extending along the coil in the winding direction of the coil; and
 an insulating member that insulates the coil and the core from each other,
 the refrigerant flow path being formed so that a refrigerant flowing from the refrigerant inlet to the refrigerant outlet mainly flows along the coil in a winding direction of the coil,
 the insulating member being disposed on both sides in an axial direction of the coil and on a radially inner side of the coil, and
 the main flow path including a gap between a radially outer side of the coil and the core.

2. The thrust magnetic bearing according to claim 1, further comprising:
 a blocking member that blocks a flow of the refrigerant in a gap between the core and a wall portion of the insulating member disposed at an end portion in the axial direction of the coil.

3. The thrust magnetic bearing according to claim 1, wherein
 the refrigerant flow path includes the main flow path, and a sub flow path including a gap between the core and a wall portion of the insulating member disposed at an end portion in the axial direction of the coil.

4. The thrust magnetic bearing according to claim 3, wherein
 a flow-path sectional area of the main flow path is larger than a flow-path sectional area of the sub flow path.

5. The thrust magnetic bearing according to claim 1, wherein
 the core is provided with a through-hole passing through the core in the axial direction at a position radially inside the coil,
 a shaft is inserted into the through-hole, the shaft being configured to radially discharge, by rotation, the refrigerant flowing in the shaft, and
 the refrigerant inlet is open on an inner peripheral surface of the through-hole.

6. The thrust magnetic bearing according to claim 5, wherein
 the refrigerant flow path includes the main flow path and a communication flow path including a gap between the core and a wall portion of the insulating member disposed at an end portion in the axial direction of the coil and connecting the refrigerant inlet and the main flow path.

7. The thrust magnetic bearing according to claim 5, wherein
 a groove extending radially is provided in a surface of a wall portion of the insulating member disposed at an end portion in the axial direction of the coil, the surface facing the core, and
 the refrigerant flow path includes the main flow path and a communication flow path including the groove of the wall portion of the insulating member and connecting the refrigerant inlet and the main flow path.

8. The thrust magnetic bearing according to claim 1, further comprising:
 a partition plate that is provided in the gap between the radially outer side of the coil and the core.

9. The thrust magnetic bearing according to claim 8, wherein the partition plate divides the gap between the radially outer side of the coil and the core into a plurality of flow paths.

10. The thrust magnetic bearing according to claim 8, wherein the partition plate divides the gap between the radially outer side of the coil and the core in the winding direction.

11. The thrust magnetic bearing according to claim 8, wherein
- the partition plate divides the gap between the radially outer side of the coil and the core in the axial direction,
- the partition plate is provided with a cutout through which the refrigerant passes in the axial direction, and
- at least one of the refrigerant inlet and the refrigerant outlet is provided at a position different from a position at which the at least one of the refrigerant inlet and the refrigerant outlet overlaps the cutout when viewed in the axial direction.

12. The thrust magnetic bearing according to claim 1, wherein
- the refrigerant outlet is provided at a position different from a position at which the refrigerant outlet is visible from the refrigerant inlet when viewed in the axial direction of the coil.

13. The thrust magnetic bearing according to claim 1, wherein
- the refrigerant flow path faces the coil.

14. The thrust magnetic bearing according to claim 1, wherein
- a refrigerant pressure at the refrigerant inlet is higher than a refrigerant pressure at the refrigerant outlet.

* * * * *